United States Patent
Guzman et al.

(10) Patent No.: US 12,299,745 B1
(45) Date of Patent: May 13, 2025

(54) METHODS AND SYSTEMS TO QUANTIFY AND INDEX CORRELATION RISK IN FINANCIAL MARKETS AND RISK MANAGEMENT CONTRACTS THEREON

(71) Applicant: Economic Alchemy Inc., New York, NY (US)

(72) Inventors: Giselle Claudette Guzman, New York, NY (US); Lawrence Klein, Gladwyne, PA (US)

(73) Assignee: ECONOMIC ALCHEMY INC., NY (US)

( * ) Notice: Subject to any disclaimer, the term of this patent is extended or adjusted under 35 U.S.C. 154(b) by 194 days.

(21) Appl. No.: 18/113,289

(22) Filed: Feb. 23, 2023

Related U.S. Application Data

(63) Continuation of application No. 17/355,724, filed on Jun. 23, 2021, now Pat. No. 11,593,886, which is a continuation of application No. 16/905,542, filed on Jun. 18, 2020, now Pat. No. 11,080,789, which is a continuation of application No. 13/677,278, filed on Nov. 14, 2012, now abandoned.

(60) Provisional application No. 61/629,227, filed on Nov. 14, 2011.

(51) Int. Cl.
| | | |
|---|---|---|
| *G06Q 40/06* | (2012.01) | |
| *G06Q 10/04* | (2023.01) | |
| *G06Q 30/02* | (2023.01) | |
| *G06Q 40/08* | (2012.01) | |

(52) U.S. Cl.
CPC ............ *G06Q 40/06* (2013.01); *G06Q 10/04* (2013.01); *G06Q 30/02* (2013.01); *G06Q 40/08* (2013.01)

(58) Field of Classification Search
None
See application file for complete search history.

(56) References Cited

U.S. PATENT DOCUMENTS

| | | |
|---|---|---|
| 5,521,814 A | 5/1996 | Teran et al. |
| 5,701,400 A | 12/1997 | Amado |
| 5,727,161 A | 3/1998 | Purcell, Jr. |
| 5,812,988 A | 9/1998 | Sandretto |

(Continued)

FOREIGN PATENT DOCUMENTS

| | | |
|---|---|---|
| EP | 2182481 A1 | 5/2010 |
| KR | 20060123116 A | 12/2006 |

(Continued)

OTHER PUBLICATIONS

J. He, J. Wang and X. Jiang, "The Decision of Price Risk of Portfolio in Inventory Financing," 2013 IEEE International Conference on Systems, Man, and Cybernetics, Manchester, UK, 2013, pp. 2985-2990 (Decision). (Year: 2013).*

(Continued)

*Primary Examiner* — Chikaodinaka Ojiaku

(57) ABSTRACT

Systems and methods for creating indicators to quantify and index correlation risk that is market-wide among a broad set of asset classes or portfolio specific relative to an investor's portfolio holdings. The present disclosure relates to risk management in financial markets, and in particular to systems and methods for quantifying and indexing correlation risk such that these indices can serve as underlying assets for futures and options or other financial instruments that investors would use to hedge against the risk.

20 Claims, 3 Drawing Sheets

(56) References Cited

U.S. PATENT DOCUMENTS

| | | | |
|---|---|---|---|
| 5,852,811 A | 12/1998 | Atkins | |
| 5,875,437 A | 2/1999 | Atkins | |
| 5,918,217 A * | 6/1999 | Maggioncalda | G06Q 30/0601 |
| | | | 705/36 R |
| 5,930,762 A | 7/1999 | Masch | |
| 5,946,667 A | 8/1999 | Tull, Jr. et al. | |
| 5,987,435 A | 11/1999 | Weiss et al. | |
| 6,018,722 A | 1/2000 | Ray et al. | |
| 6,038,540 A | 3/2000 | Krist et al. | |
| 6,092,056 A | 7/2000 | Tull, Jr. et al. | |
| 6,125,355 A | 9/2000 | Bekaert et al. | |
| 6,338,047 B1 * | 1/2002 | Wallman | G06Q 40/06 |
| | | | 705/36 R |
| 6,341,271 B1 | 1/2002 | Salvo et al. | |
| 6,366,870 B2 * | 4/2002 | Jarman | G06F 17/18 |
| | | | 702/179 |
| 6,513,020 B1 | 1/2003 | Weiss et al. | |
| 6,658,467 B1 | 12/2003 | Rice et al. | |
| 6,792,399 B1 | 9/2004 | Phillips et al. | |
| 6,876,992 B1 | 4/2005 | Sullivan | |
| 7,062,447 B1 | 6/2006 | Valentine et al. | |
| 7,072,863 B1 | 7/2006 | Phillips et al. | |
| 7,175,072 B2 | 2/2007 | Krishnan et al. | |
| 7,191,150 B1 | 3/2007 | Shao et al. | |
| 7,415,432 B1 * | 8/2008 | Gianakouros | G06Q 40/06 |
| | | | 705/37 |
| 7,464,006 B1 * | 12/2008 | Huang | G06Q 40/06 |
| | | | 702/190 |
| 7,474,985 B1 * | 1/2009 | Pugh | G16Z 99/00 |
| | | | 702/179 |
| 7,480,659 B2 | 1/2009 | Chmura et al. | |
| 7,546,265 B1 | 6/2009 | Donner | |
| 7,599,872 B2 | 10/2009 | Dundas et al. | |
| 7,664,693 B1 * | 2/2010 | von Groll | G06Q 40/06 |
| | | | 705/5 |
| 7,676,375 B1 | 3/2010 | Neifeld et al. | |
| 7,707,091 B1 | 4/2010 | Kauffman et al. | |
| 7,730,019 B1 | 6/2010 | Graham | |
| 7,769,657 B2 | 8/2010 | Chacko et al. | |
| 7,958,204 B1 | 6/2011 | Phillips et al. | |
| 8,108,290 B2 | 1/2012 | Speth et al. | |
| 8,156,035 B2 | 4/2012 | Ferguson et al. | |
| 8,190,458 B2 | 5/2012 | Back et al. | |
| 8,200,477 B2 | 6/2012 | Yi et al. | |
| 8,229,866 B2 | 7/2012 | Alaniz | |
| 8,234,201 B1 | 7/2012 | Canabarro | |
| 8,250,009 B1 | 8/2012 | Breckenridge et al. | |
| 8,275,637 B1 | 9/2012 | Glacy, Jr. et al. | |
| 8,335,735 B1 | 12/2012 | Chafkin et al. | |
| 8,346,647 B1 | 1/2013 | Phelps et al. | |
| 8,407,118 B1 | 3/2013 | Zazelenchuk et al. | |
| 8,433,640 B2 * | 4/2013 | Rooney | G06Q 40/04 |
| | | | 705/37 |
| 8,452,677 B1 * | 5/2013 | de la Houssaye | G06Q 40/04 |
| | | | 705/35 |
| 8,515,851 B2 | 8/2013 | Cardoza et al. | |
| 8,533,082 B1 | 9/2013 | Sudjianto et al. | |
| 8,533,089 B1 | 9/2013 | Renshaw | |
| 8,566,067 B2 | 10/2013 | Johnson et al. | |
| 8,606,681 B2 | 12/2013 | O'Rourke | |
| 8,798,399 B2 | 8/2014 | Huang et al. | |
| 9,508,082 B1 | 11/2016 | Mannix et al. | |
| 9,547,477 B2 * | 1/2017 | Mun | G06Q 40/02 |
| 10,038,703 B2 | 7/2018 | Liu et al. | |
| 10,838,965 B1 * | 11/2020 | Todd | G06F 16/9024 |
| 2002/0023045 A1 | 2/2002 | Feilbogen et al. | |
| 2002/0138388 A1 * | 9/2002 | Reiss | G06Q 40/02 |
| | | | 705/36 R |
| 2002/0151992 A1 | 10/2002 | Hoffberg et al. | |
| 2003/0018548 A1 | 1/2003 | Cattaneo et al. | |
| 2003/0035468 A1 | 2/2003 | Corbaton et al. | |
| 2003/0046212 A1 * | 3/2003 | Hunter | G06Q 40/08 |
| | | | 705/36 R |
| 2003/0074244 A1 | 4/2003 | Braxton | |
| 2003/0093347 A1 | 5/2003 | Gray | |
| 2003/0105703 A1 | 6/2003 | Palsky et al. | |
| 2003/0130975 A1 | 7/2003 | Muller | |
| 2003/0149586 A1 | 8/2003 | Chen et al. | |
| 2003/0225719 A1 | 12/2003 | Juang et al. | |
| 2004/0015376 A1 | 1/2004 | Zhu et al. | |
| 2004/0024606 A1 | 2/2004 | Chukwu | |
| 2004/0030624 A1 | 2/2004 | Nishimaki | |
| 2004/0073506 A1 | 4/2004 | Tull, Jr. et al. | |
| 2004/0172352 A1 | 9/2004 | Deretz | |
| 2004/0181422 A1 | 9/2004 | Brand | |
| 2004/0186803 A1 | 9/2004 | Weber et al. | |
| 2004/0193524 A1 | 9/2004 | Almeida et al. | |
| 2004/0202914 A1 | 10/2004 | Sridhar et al. | |
| 2004/0204775 A1 | 10/2004 | Keyes et al. | |
| 2004/0267684 A1 | 12/2004 | Erdem et al. | |
| 2005/0016947 A1 | 1/2005 | Fatke et al. | |
| 2005/0021517 A1 | 1/2005 | Marchisio | |
| 2005/0071300 A1 | 3/2005 | Bartlett et al. | |
| 2005/0080704 A1 | 4/2005 | Erlach et al. | |
| 2005/0096893 A1 | 5/2005 | Feraille et al. | |
| 2005/0102175 A1 | 5/2005 | Dudat et al. | |
| 2005/0119922 A1 * | 6/2005 | Eder | G06Q 40/02 |
| | | | 705/7.31 |
| 2005/0154658 A1 * | 7/2005 | Bove | G06Q 40/04 |
| | | | 705/35 |
| 2005/0228591 A1 | 10/2005 | Hur et al. | |
| 2005/0240465 A1 | 10/2005 | Kiran et al. | |
| 2005/0262002 A1 | 11/2005 | Manning et al. | |
| 2005/0273319 A1 | 12/2005 | Dittmar et al. | |
| 2005/0273376 A1 | 12/2005 | Ouimet et al. | |
| 2005/0273377 A1 | 12/2005 | Ouimet et al. | |
| 2006/0004653 A1 | 1/2006 | Strongin, II | |
| 2006/0085455 A1 | 4/2006 | Chmura et al. | |
| 2006/0190303 A1 | 8/2006 | Yourist et al. | |
| 2006/0248096 A1 | 11/2006 | Adam | |
| 2006/0262865 A1 | 11/2006 | Moran | |
| 2006/0282380 A1 | 12/2006 | Birney et al. | |
| 2007/0086513 A1 | 4/2007 | Fernandez-Corbaton et al. | |
| 2007/0129838 A1 | 6/2007 | Bendix | |
| 2007/0130060 A1 | 6/2007 | Ariarajah et al. | |
| 2007/0208599 A1 | 9/2007 | Cornford | |
| 2007/0239571 A1 | 10/2007 | Michaletz | |
| 2007/0244785 A1 | 10/2007 | Williams | |
| 2007/0282758 A1 * | 12/2007 | Vischer | G06Q 40/04 |
| | | | 705/36 R |
| 2007/0288336 A1 | 12/2007 | Malaviya et al. | |
| 2008/0052097 A1 | 2/2008 | Bouzas et al. | |
| 2008/0071588 A1 * | 3/2008 | Eder | G06Q 30/02 |
| | | | 705/7.31 |
| 2008/0120250 A1 * | 5/2008 | Hiatt, Jr. | G06Q 40/04 |
| | | | 709/202 |
| 2008/0222052 A1 * | 9/2008 | Choueifaty | G06Q 40/06 |
| | | | 705/36 R |
| 2008/0270314 A1 | 10/2008 | Birney et al. | |
| 2008/0281581 A1 | 11/2008 | Henshaw et al. | |
| 2008/0288596 A1 | 11/2008 | Smith et al. | |
| 2008/0319712 A1 | 12/2008 | Claps | |
| 2008/0319829 A1 | 12/2008 | Hunt et al. | |
| 2008/0319923 A1 | 12/2008 | Casey et al. | |
| 2009/0018891 A1 * | 1/2009 | Eder | G06Q 10/0635 |
| | | | 705/7.29 |
| 2009/0018996 A1 | 1/2009 | Hunt et al. | |
| 2009/0043637 A1 * | 2/2009 | Eder | G06N 7/01 |
| | | | 705/37 |
| 2009/0043713 A1 | 2/2009 | Weber et al. | |
| 2009/0076987 A1 | 3/2009 | Chmura et al. | |
| 2009/0097772 A1 | 4/2009 | Zhao et al. | |
| 2009/0119200 A1 | 5/2009 | Riviere | |
| 2009/0132347 A1 | 5/2009 | Anderson et al. | |
| 2009/0172821 A1 * | 7/2009 | Daira | H04W 12/122 |
| | | | 707/999.005 |
| 2009/0177589 A1 | 7/2009 | Edgar et al. | |
| 2009/0204446 A1 * | 8/2009 | Simon | G06Q 40/08 |
| | | | 703/3 |
| 2009/0217302 A1 | 8/2009 | Grechanik et al. | |
| 2009/0238426 A1 | 9/2009 | Fear et al. | |
| 2009/0254389 A1 | 10/2009 | Teal et al. | |

(56) References Cited

U.S. PATENT DOCUMENTS

| | | | |
|---|---|---|---|
| 2009/0254395 A1 | 10/2009 | Lynn et al. | |
| 2009/0254971 A1 | 10/2009 | Herz et al. | |
| 2009/0265281 A1 | 10/2009 | Cohen et al. | |
| 2009/0281964 A1* | 11/2009 | Broms | G06Q 40/06 705/36 R |
| 2009/0292662 A1 | 11/2009 | Ueno et al. | |
| 2009/0307057 A1 | 12/2009 | Azout et al. | |
| 2009/0319436 A1 | 12/2009 | Andra et al. | |
| 2010/0036529 A1 | 2/2010 | Landells et al. | |
| 2010/0042553 A1 | 2/2010 | Van Erlach | |
| 2010/0070485 A1 | 3/2010 | Parsons et al. | |
| 2010/0076785 A1 | 3/2010 | Mehta et al. | |
| 2010/0076904 A1 | 3/2010 | Ghosh et al. | |
| 2010/0076966 A1 | 3/2010 | Strutton et al. | |
| 2010/0119053 A1 | 5/2010 | Goeldi | |
| 2010/0121707 A1 | 5/2010 | Goeldi | |
| 2010/0121843 A1 | 5/2010 | Goeldi | |
| 2010/0125532 A1 | 5/2010 | Cohen et al. | |
| 2010/0145773 A1 | 6/2010 | Desai et al. | |
| 2010/0179921 A1 | 7/2010 | Scheinerman | |
| 2010/0179930 A1 | 7/2010 | Teller et al. | |
| 2010/0185716 A1 | 7/2010 | Nakamura et al. | |
| 2010/0204967 A1* | 8/2010 | Mun | G06F 7/60 703/2 |
| 2010/0205117 A1 | 8/2010 | Van Erlach et al. | |
| 2010/0205124 A1 | 8/2010 | Ben-Hur et al. | |
| 2010/0205131 A1 | 8/2010 | Kumar et al. | |
| 2010/0228685 A1 | 9/2010 | Barsade et al. | |
| 2010/0262597 A1 | 10/2010 | Han | |
| 2010/0305913 A1 | 12/2010 | Johnson et al. | |
| 2010/0312724 A1 | 12/2010 | Pinckney et al. | |
| 2011/0040635 A1 | 2/2011 | Simmons et al. | |
| 2011/0060572 A1 | 3/2011 | Brown et al. | |
| 2011/0071857 A1 | 3/2011 | Malov et al. | |
| 2011/0071885 A1 | 3/2011 | Ayres De Castro et al. | |
| 2011/0106578 A1 | 5/2011 | Cerminaro | |
| 2011/0106589 A1 | 5/2011 | Blomberg et al. | |
| 2011/0112995 A1 | 5/2011 | Chang et al. | |
| 2011/0125623 A1 | 5/2011 | DeLillio | |
| 2011/0137825 A1 | 6/2011 | Weber et al. | |
| 2011/0145126 A1* | 6/2011 | Rooney | G06Q 40/04 705/37 |
| 2011/0153412 A1 | 6/2011 | Novikov et al. | |
| 2011/0153451 A1 | 6/2011 | Bitz et al. | |
| 2011/0191372 A1 | 8/2011 | Kaushansky et al. | |
| 2011/0202475 A1* | 8/2011 | Choueifaty | G06Q 40/06 705/36 R |
| 2011/0246155 A1 | 10/2011 | Fitch et al. | |
| 2011/0246179 A1 | 10/2011 | O'Neil | |
| 2011/0251974 A1 | 10/2011 | Woodard et al. | |
| 2011/0282943 A1 | 11/2011 | Anderson et al. | |
| 2011/0302106 A1 | 12/2011 | Nosegbe | |
| 2011/0320334 A1* | 12/2011 | Mintz | G06Q 30/06 705/37 |
| 2012/0019307 A1 | 1/2012 | Ludwig | |
| 2012/0023040 A1 | 1/2012 | Benoit et al. | |
| 2012/0030082 A1 | 2/2012 | Voltz et al. | |
| 2012/0036085 A1 | 2/2012 | Srivastava et al. | |
| 2012/0041880 A1 | 2/2012 | Shai | |
| 2012/0041937 A1 | 2/2012 | Dhillon et al. | |
| 2012/0046938 A1 | 2/2012 | Godbole et al. | |
| 2012/0047219 A1 | 2/2012 | Feng et al. | |
| 2012/0066024 A1 | 3/2012 | Strongin, II | |
| 2012/0069131 A1 | 3/2012 | Abelow | |
| 2012/0095802 A1 | 4/2012 | Wilberding et al. | |
| 2012/0101805 A1 | 4/2012 | Barbosa et al. | |
| 2012/0101808 A1 | 4/2012 | Duong-Van | |
| 2012/0116941 A1 | 5/2012 | Pazner | |
| 2012/0143683 A1 | 6/2012 | Hertz et al. | |
| 2012/0143738 A1 | 6/2012 | McConnel | |
| 2012/0143739 A1 | 6/2012 | Lopez de Prado et al. | |
| 2012/0143740 A1 | 6/2012 | Lopez de Prado et al. | |
| 2012/0143741 A1 | 6/2012 | Lopez de Prado et al. | |
| 2012/0158613 A1 | 6/2012 | Bollen et al. | |
| 2012/0166330 A1 | 6/2012 | Kemp, II et al. | |
| 2012/0173302 A1 | 7/2012 | Dooley et al. | |
| 2012/0179692 A1 | 7/2012 | Hsiao et al. | |
| 2012/0185544 A1 | 7/2012 | Chang et al. | |
| 2012/0191730 A1 | 7/2012 | Parikh et al. | |
| 2012/0203684 A1 | 8/2012 | Gilbert et al. | |
| 2012/0215717 A1 | 8/2012 | Arnott et al. | |
| 2012/0226645 A1* | 9/2012 | O'Rourke | G06Q 40/06 706/46 |
| 2012/0246048 A1 | 9/2012 | Cohen et al. | |
| 2012/0316904 A1* | 12/2012 | Eder | G06Q 10/06 705/7.11 |
| 2012/0323674 A1 | 12/2012 | Simmons et al. | |
| 2012/0330810 A1 | 12/2012 | Dadkar | |
| 2013/0041841 A1 | 2/2013 | Lyons | |
| 2013/0041848 A1 | 2/2013 | Stubbs et al. | |
| 2013/0060603 A1 | 3/2013 | Wagner | |
| 2013/0218736 A1 | 8/2013 | Eisen et al. | |
| 2013/0297479 A1* | 11/2013 | Rooney | G06Q 40/04 705/37 |
| 2013/0332391 A1 | 12/2013 | Renshaw | |
| 2013/0342538 A1 | 12/2013 | Kozine et al. | |
| 2014/0012776 A1 | 1/2014 | Lo et al. | |
| 2014/0046872 A1 | 2/2014 | Arnott et al. | |
| 2014/0067279 A1 | 3/2014 | George et al. | |
| 2014/0108059 A1 | 4/2014 | Ring et al. | |
| 2014/0257829 A1 | 9/2014 | Schuetz et al. | |
| 2014/0278472 A1 | 9/2014 | Guetz | |
| 2014/0279701 A1* | 9/2014 | Farrow | G06Q 40/06 705/36 R |
| 2014/0372172 A1 | 12/2014 | Frías Martínez et al. | |
| 2015/0127425 A1 | 5/2015 | Greene et al. | |
| 2015/0142713 A1 | 5/2015 | Gopinathan et al. | |
| 2016/0140584 A1 | 5/2016 | Moghtaderi | |
| 2016/0379388 A1 | 12/2016 | Rasco et al. | |
| 2017/0300824 A1 | 10/2017 | Peng et al. | |
| 2022/0261909 A1* | 8/2022 | Brianti | G06Q 40/04 |

FOREIGN PATENT DOCUMENTS

| | | |
|---|---|---|
| KR | 100930505 B1 | 12/2009 |
| WO | 2002099601 A2 | 12/2002 |
| WO | 2006121338 A2 | 11/2006 |
| WO | 2007106475 A2 | 9/2007 |
| WO | 2011095988 A2 | 8/2011 |
| WO | 2011119509 A1 | 9/2011 |

OTHER PUBLICATIONS

Matúš Medo, Chi Ho Yeung, Yi-Cheng Zhang, How to quantify the influence of correlations on investment diversification, International Review of Financial Analysis, vol. 18, Issues 1-2, (Correlations) (Year: 2009).*
https://www.markit.com/Company/Files/PressReleaseFile?CMSID=7bc848f709574b9a99f4c56a71548aa0, Jun. 2016, 2 pages.
Finance Magnate, "European Commission Selects Markit for its Fixed Income Solution", Jun. 15, 2016, 3 pages. (https://www.financemagnates.com/institutional-forex/technology/european-commission-selects-markit-for-its-fixed-income-solution).
https://www.blackrock.com/US/individual/literature/whitepaper/bii-introduction-to-gps.pdf, Sep. 2016, 2 pages.
BlackRock Investment Institute, "BlackRock Macro Dashboard", 2019, 6 pages. (https://www.blackrock.com/corporate/insights/blackrock-investment-institute/data-visuals/macro-dashboard).
DeepMacro, "Frequently Asked Questions", 2016, 7 pages. (https://beta.deepmacro.com/faq).
"Ice Data Services Summary: Final SEC Rules for Liquidity Risk Management Programs", Jul. 7, 2017, 2 pages. (https://www.theice.com/market-data/pricing-and-analytics/analytics/liquidity/SECLRM, 2017).
"Ice Liquidity Indicators", Dec. 21, 2016, 3 pages. (https://web.archive.org/web/20161221065616/https://www.theice.com/market-data/pricing-and-analytics/analytics/liquidity).
Hoover, Kevin D. et al., "Data-mining reconsidered: encompassing and the general-to-specific approach to specific search", Econometrics Journal (1999), vol. 2, pp. 167-191.

(56) References Cited

OTHER PUBLICATIONS

"Diseases Tracked by Using Google Trends", Spain, Emerging Infectious Diseases, 111.cdc.gov/eid, vol. 16, No. 1, Jan. 2010.
Angelini, Elena et al., "Estimating and forecasting the euro area monthly national accounts from a dynamic factor model"; European Central Bank, Working Paper Series, No. 953, Oct. 2008, 31 pages.
Choudhry, Moorad et al., "Measuring Bond Market Liquidity: Devising a Composite Aggregate Liquidity Score"; Applied Financial Economics, vol. 20, 2010; pp. 955-973.
Agrrawal, Pankaj et al., "A Multivariate Liquidity Score and Ranking Device for ETFs," 2009, Academy of Financial Services, pp. 2-18.
Tanaka-Yamawaki, Mieko, "Cross Correlation of Intra-Day Stock Prices in Comparison to Random Matrix Theory", Intelligent Information Management, (May 2011 ), pp. 65-70.
PM Polgreen et al., "Using internet searches for influenza surveillance," Clinical Infectious Diseases, 47(2008), pp. 1443-1448.
J. Ritterman et al. "Using prediction markets and Twitter to predict a swine flu pandemic," Proceedings of the 1st International Workshop on Mining Social Media (2009).
H. Song et al., "Forecasting hotel room demand using search engine data," College of Charleston Working Paper (2009).
JH Stock et al., "Forecasting inflation," Journal of Monetary Economics, 44(1999), pp. 293-335.
JH Stock et al., "Macroeconomic forecasting using diffusion indexes," Journal of business & Economic Statistics, 20 (2) 2002), pp. 147-162.
T. Suhoy, "Query indices and a 2006 downturn: Israeli data," Bank of Israel Discussion Paper (2009).
T. Suhoy, "Monthly assessments of private consumption," Bank of Israel Discussion Paper (2010).
LB Thomas, "Survey measures of expected US inflation," The Journal of Economic Perspectives 13(4) (1999), pp. 125-144.
S. Vosen et al., "Forecasting private consumption: survey-based indicators vs. Google Trends," Journal of Forecasting, 10.1002, (2011).
Klein, LR. et al., "Economic Forecasting at high-frequency intervals," Journal of Forecasting, vol. 12, Issue 3-4, pp. 301-319 (Apr. 1993). http:l/onlinelibrary_wiley.com/doi/10.1002/for.3980120910/abstract.
Preis et al., "Complex dynamics of our economic life on different scales: insights from search engine query data," Phil. Wrans. R. Soc_ A.2010 368, pp. 5707-5719.
Harding, "Google to map inflation using web data," Financial Times, Oct. 11, 2010.
Vlastakis et al., "Information Demand and Stock Market Volatility," Athena University, May 2010.
Zhi Da et al., "In Search of Attention," SSRN 1364209, Jun. 4, 2009, 45 pages.
Finance Team, "Google Domestic Trends," download date Jul. 17, 2015.
Sharad Goel, "What can search predict?" Messy Matters, Nov. 30, 2009.
Goel et al., "What can search predict?" Yahoo! Labs; Jan. 1, 1979.
Ettredge et al., "Using web-based search data to predict macroeconomic statistics," Commun, ACM, 48(11) 87(92), 2005.
Huang et al., "Constructing Consumer Sentiment Index for US Using Internet Search Patterns"; University of Alberta, Department of Economics, Working Paper No. 2009-26, Oct. 2009, 22 pages.
Shimshoni et al., "On the Predictability of Trends," Google, Israel Labs, Aug. 17, 2009.
Sornette et al., "Endogenous versus exogenous shocks in complex network: an empirical test using book sale rankings," APS preprint, Feb. 2, 2006.
Valdivia et al., "Diseases tracked by using Google Trends," Emerging Infectious Diseases, vol. 16, No. 1, Jan. 2010.
Pelat et al., "More diseases tracked by using Google Trends," Emerging Infectious Diseases, 2009, 15:1327-8.
Matheson, Troy D. (Jan. 2010). "An analysis of the informational content of New Zealand data releases: The mportance of business opinion surveys", Economic Modeling (Elsevier) 27 (1); pp. 304-314. http://www.sciencedirect.com/science/article/pii/S0264999309001679.
M. Woodford, "Interest and Prices", Princeton University Press, Princeton, 2003.
G. Guzman, "GDP Growth Signals, Investor Psychology, and Hedging Pressure: A Multivariable Approach to Forecasting Returns on the S&P500 Index", Independent Study, The Wharton School, University of Pennsylvania, 2003.
Hoffman et al., "Are Brand Attitudes Contagious? Consumer Response to Organic Search Trends", Nov. 2009.
Bardhan et al., "The Past as Prologue? Business Cycles and Forecasting since the 1960s", Fisher Center for Real Estate and Urban Economics, UC Berkeley, Mar. 19, 2010.
Radinsky et al., "Predicting the News of Tomorrow Using Patterns in Web Search Queries", Proceedings of the 2008 IEEE/WIC/ACM International Conference on Web Intelligence, 2008.
Brownstein et al., "Digital Disease Detection—Harnessing the Web for Public Health Surveillance," The New England Uournal of Medicine; May 21, 2009.
Cooper et al., "Cancer Internet Search Activity on a Major Search Engine, United States 2001-2004," J Med Internal Res, 7, 2005.
Corely et al., "Monitoring Influenza Trends Through Mining Social Media," Proceedings of the 2009 International Conference on Bioinformatics and Computational Biology (BIOCOMP09), 2009.
Hulth et al., "Web Queries as a Source of Syndromic Surveillance," Department of Epidemiology, Swedish Institute of Infectious Disease Control, PLoS ONE, 5, 2009.
Wilson et al., "Early Detection of Disease Outbreaks Using the Internet," CMAJ, Mar. 12, 2009.
Clements et al., "Report of a Scoping Study of Forecasting in the National Accounts at the Office for National Statistics," Statistics Commission, Mar. 5, 2003.
Guzman, Giselle, "Internet Search Behavior as an Economic Forecasting Tool: The Case of Inflation Expectations," Nov. 29, 2011.
Moghtaderi et al., "Trend filtering via empirical mode decomposition," Computational Statistics & Data Analysis 58 (2013): 114-126, (Year: 2013), 13 pages.
Cristelli et al., "The heterogeneous dynamics of economic complexity," PLoS One. Feb. 11, 2015;10(2):e0117174. doi: 10.1371/journal.pone.0117174, PMID: 2567131, (Year: 2015), 15 pages.
Muranga et al., "Measurement of liquidity risk in the context of market risk calculation," a BIS volume entitled The Measurement of Aggregate Risk (1997), https://citeseerx.ist/psu/edu/viewdoc/download?doi=10.1.1.452.4012&rep=rep1&type=pdf, 1997, 22 pages.
Pan, Feng et al., "A New Hybrid Model for Time-series Prediction," 2009 8th IEEE International Conference on Cognitive Informatics, Hong Kong China, pp. 281-286.
Matus Medo, Chi Ho Yeung, Yi-Cheng Zhang, How to quantify the influence of correlations on investment diversification, International Review of Financial Analysis, vol. 18, Issues 1-2, (Correlation) (Year: 2009).
Office Action for U.S. Appl. No. 13/677,276 dated Jan. 6, 2015; 12 pgs.
U.S. Appl. No. 13/677,277, Non-Final Office Action mailed Oct. 15, 2014, 6 pgs.
U.S. Appl. No. 13/677,277, Non-Final Office Action mailed Mar. 24, 2014, 5 pgs.
U.S. Appl. No. 13/677,278, Final Office Action mailed Oct. 9, 2014, 13 pgs.
U.S. Appl. No. 13/677,278, Restriction Requirement mailed Dec. 24, 2013, 7 pgs.
U.S. Appl. No. 13/677,278, Non-Final Office Action mailed May 22, 2013, 10 pgs.
U.S. Appl. No. 13/677,297, Non-Final Office Action mailed Jan. 16, 2014, 8 pgs.
U.S. Appl. No. 13/677,297, Non-Final Office Action mailed Oct. 23, 2014, 13 pgs.
Klein, Lawrence R, "The Making of National Economic Forecasts", Edward Elgar Publishing Limited, Northampton, MA, USA, (2009), 403 pgs.
Schmidt, Thorsten, "Correlation and Correlation Risk", University of Leipzig, Dep. of Mathematics, 2009, 4 pgs.

(56) References Cited

OTHER PUBLICATIONS

Driessen et al., "The Price of Correlation Risk: Evidence from Equity Options", The Journal of Finance, vol. 64, No. 3, Jun. 2009, 30 pgs.
U.S. Appl. No. 13/677,273, Notice of Allowance mailed Oct. 1, 2014, 8 pgs.
U.S. Appl. No. 13/677,273, Non-Final Office Action mailed Mar. 25, 2014, 14 pgs.
Amihud, Yakov; "Illiquidity and Stock Returns: Cross-Section and Time-Series Effects"; Journal of Financial Markets 5 (2002) pp. 31-56.
Mouchart, Michel, et al.; "Clustered Panel Data Models: An Efficient Approach for Nowcasting from Poor Data"; Dec. 4, 2003; 30 pages.
Cors, Andreas et al.; "An Approach for Timely Estimations of the German GDP (Abstract)"; AStA Advances in Statistical Analysis, vol. 87, No. 2, 2003; 2 pages.
Baffigi, Alberto et al.; "Bridge Models to Forecast the Euro Area GDP (Abstract)"; International Journal of Foecasting, vol. 20, Issue 3, Jul.-Sep. 2004; 3 pages.
Mouchart, Michel, et al.; "Clustered Panel Data Models: An Efficient Approach for Nowcasting from Poor Data"; International Journal of Forecasting 21 (2005) 577-594; 2005; 18 pages.
Nunes, Luis C.; "Nowcasting Quarterly GDP Growth in a Monthly Coincident Indicator Model (Abstract)"; Journal of Forecasting, vol. 24, Issue 8; Dec. 20, 2005; 4 pages.
Altissimo, Filippo et al.; "New Eurocoin: Tracking Economic Growth in Real Time"; Centre for Economic Policy Reseach Discussion Paper Series, Discussion Paper No. 5633, Apr. 2006; 37 pages.
Banbura, Marta et al.; "A Look Into the Factor Model Black Box: Publication Lags and the Role of Hard and Soft Data in Forecasting GDP"; Nov. 2006; 26 pages.
Marcellino, Massimiliano et al.; "Factor-MIDAS for Now- and Forcasting with Ragged-Edge Data: A Model Comparision for German GDP"; Bank of England CCBS Research Forum, 2007; 41 pages.
Monti, Francesca; "Forecast with Judgement and Models"; National Bank of Belgium, Working Paper Research, No. 153, Dec. 2008; 44 pages.
Matheson, Troy et al.; "Nowcasting and Predicting Data Revisions in Real Time Using Qualitative Panel Survey Data"; Reserve Bank of New Zealand, DP2007/02, Jan. 2007; 25 pages.
Gelper, Sarah et al.; "The Predictive Power of the European Economic Sentiment Indicator"; Katholieke Universiteit Leuven, Department of Decision Sciences and Information Management, Jan. 22, 2007; 15 pages.
Galbraith, John W. et al.; "Electronic Transactions as High-Frequency Indicators of Economic Activity"; Bank of Canada, Working Paper 2007-58, Dec. 2007; 29 pages.
Clements, Michael P. et al.; "Macroeconomic Forecasting with Mixed-Frequency Data: Forecasting Output Growth In the United States"; Journal of Nusiness and Economic Statistics, Oct. 2008, 10 pages.
Darne, Olivier; "Using Business Survey in Industrial and Services Sector to Nowcast GDP Growth: The French Case"; Economic Bulletin, Jul. 2008; 10 pages.
Kholodilin, Konstantin A., et al.; "A New Business Barometer for Germany: Construction and Evaluation of the Nowcast Accuracy"; Nov. 18, 2008; 11 pages.
D'Agostino, Antonello, et al.; "Now-Casting Irish GDP"; Central Bank & Financial Servies Authroity of Ireland, Research Technical Paper, 9/RT/08, Nov. 2008; 25 pages.
Proietti, Tommaso; "Estimation fo Common Factors under Cross-Sectional and Temporal Aggregation Constraints: Nowcasting Monthly GDP and its Main Components (Abstract)"; MPRA Paper, University Library of Munich, Germany, New Economic Papers, Jan. 22, 2008; 1 page.
Aastveit, Knut Are, et al.; "Estimating the Output Gap in Real-Time: A Factor Model Approach"; Dec. 9, 2008; 10 pages.

Lee, Kevin, et al.; "Nowcasting, Business Cycle Dating and the Interpreation of the New Information when Real Time Data are Available"; The University of Melbourne, Department of Economics, Research Paper No. 1040, May 2008; 45 pages.
Kuzin, Vladimir, et al.; "Pooling Versus Model Selection for Nowcasting with Many Predictors: An Application to German GDP"; Deutsche Bundesbank Eurosystem, Discussion Paper, Series 1: Economic Studies, No. Mar. 2009, 2009; 55 pages.
Castle, Jennifer, et al.; "Nowcasting is Not Just Contemporaneous Forecasting"; National Institute Economic Review, 2009; 26 pages.
Schorfheide, Frank et al.; "Evaluating DSGE Model Forecasts of Comovements"; University of Pennsylvania, Oct. 17, 2010; 57 pages.
Aruoba, A. Boragan, et al.; "Real-Time Macroeconomic Monitoring: Real Activity, Inflation, and Interactions"; National Bureau of Economic Research, Working Paper 15657, Jan. 2010; 17 pages.
Kholodilin, Konstantin A., et al.; "Do Google Searches Help in Nowcasting Private Consumption? A Real-Time Evidence for the US"; ETH Zurich, Research Collection, Working Paper, Apr. 2010; 29 pages.
Gilbert, Thomas, et al.; "Why Do Certain Macroeconomic News Announcements Have a Big Impact on Asset Prices?"; Apr. 6, 2010; 38 pages.
Rossiter, James; "Nowcasting the Global Economy"; Bank of Canada Discussion Paper 2010-12, Sep. 2010; 26 pages.
Norin, Anna; "Nowcasting of the Gross Regional Product"; 50th Congress of the European Regional Science Association: Sustainable Regional Growth and Development in the Creative Knowledge Economy, Aug. 19-23, 2010; 11 pages.
Liebermann, Joelle; "Real-Time Nowcasting of GDP: Factor Model Versus Professional Forecasters"; Munich Personal RePEc Archive, Dec. 2010; 36 pages.
Faust, Jon et al.; "Credit Spreads as Predictors of Real-Time Economic Activity: A Bayesian Model-Averaging Approach"; National Bureau of Economic Research, Working Paper 16725, Jan. 2011; 41 pages.
Askitas, Nikolaos et al.; "Nowcasting Business Cycles Using Toll Data"; IZA Discussion Paper No. 5522, Feb. 2011; 19 pages.
Lahiri, Kajal et al.; "Nowcasting US GDP: The Role of ISM Business Surveys"; SUNY Department of Economics, Mar. 2011; 30 pages.
Sorensen, Jonas; "Indicator Models for Private Consumption"; Monetary Review, 1st Quarter 2011, Part 1; 13 pages.
Garratt, Anthony et al.; "Measuring Output Gap Nowcast Uncertainty"; The Australian National University, Centre for Applied Macroeconomic Analysis (CAMA), CAMA Working Paper 16/2011, Jun. 2011; 24 pages.
Banbura, Marta et al., "Nowcasting," Working Papers ECARES 2010-021, Oxford Handbook on Economic Forecasting (2010), 36 pages.
Branch, William A.; "Nowcasting and the Taylor Rule"; University of California, Irvine, Jul. 11, 2011; 32 pages.
Carnot, Vincent et al.; "Economic Forecasting and Policy"; Second Edition, Chapter 2, Jul. 26, 2011; 8 pages.
Guzman, Giselle C.; "Using Sentiment to Predict GDP Growth and Stock Returns"; Preliminary Draft, Munich Personal RePEc Archive, Jun. 29, 2008, 41 pages.
Guzman, Giselle C.; "An Inflation Expectations Horserace"; Preliminary Draft, Munich Personal RePEc Archive, Jan. 25, 2010; 44 pages.
Guzman, Giselle C.; "The Case for Higher Frequency Inflation Expectations"; Preliminary Draft, Munich Personal RePEc Archive, Jun. 29, 2011; 44 pages.
Guzman, Giselle C.; "Internet Search Behavior as an Economic Forecasting Tool: The Case of Inflation Expectations"; Preliminary Draft, Munich Personal RePEc Archive, Nov. 29, 2011; 38 pages.
Vosen, Simeon et al.; "A Monthly Consumption Indicator for Germany Based on Internet Search Query Data"; Applied Economic Letters, vol. 19, Iss. 7, 2012; 27 pages.
Wieland, Volker et al.; "Macroeconomic Model Comparisons and Forecast Competitions"; Voxeu.org, Feb. 13, 2012; 4 pages.

(56) References Cited

OTHER PUBLICATIONS

Matteson, David S.; "Time-Frequency Functional Models: An Approach for Identifying and Predicting Economic Recessions in Real-Time"; Cornell University, Department of Statistical Science, May 17, 2014; 42 pages.
Molodtsova, Tanya et al.; "Taylor Rule Exchange Rate Forecasting During the Financial Crisis"; National Bureau of Economic Research, Working Paper 18330, Aug. 2012; 41 pages.
Scotti, Chiara et al.; "Real-Time Aggregation of Macroeconomic Surprises: A Real Activity Surprise Index"; Federal Reserve Board, Apr. 26, 2012; 24 pages.
Campbell, Jeffrey R. et al.; "Macroeconomic Effects of Federal Reserve Forward Guidance"; Working Paper Mar. 2012, Federal Reserve Bank of Chicago, 2012; 61 pages.
D'Agostino, Antonello et al.; "Survey-Based Nowcasting of US Growth: A Real-Time Forecast Comparison Over More Than 40 Years"; European Central Bank, Working Paper No. 1455, 2012; 23 pages.
Kuzin, Vladimir, et al.; "Pooling Versus Model Selection for Nowcasting GDP with Many Predictors: Empirical Evidence for Six Industrialized Countries"; Deutsche Bundesbank, 2013; 65 pages.
Hendry, David et al.; "Forecasting and Nowcasting Macroeconomic Variables: A Methodological Overview"; University of Oxford, Department of Economics, Discussion Paper No. 674, Sep. 2013; 74 pages.
Koop, Gary et al.; "Macroeconomic Nowcasting Using Google Probabilities"; Aug. 2013; 31 pages.
Antenucci, Dolan et al.; "Ringtail: Feature Selection for Easier Nowcasting"; 16th International Workshop on the Web and Databases, Jun. 23, 2013, New York, NY; 6 pages.
Giusto, Andrea et al.; "Nowcasting U.S. Business Cycle Turning Points with Vector Quantization"; Dalhousie University, Department of Economics, Sep. 2013; 35 pages.
Herrmannova, Lenka; "Forecasting and Nowcasting Power of Confidence Indicators: Evidence for Central Europe"; Charles University in Prague, Instutute of Economic Studies, Rigorous Thesis, Sep. 9, 2013; 140 pages.
Picerno, James; "Nowcasting the Business Cycle: A Practical Guide for Spotting Business Cycle Peaks Ahead of the Crowd"; Beta Publishing, 2014; 6 pages.
O'Donoghue, Cathal et al.; "Nowcasting in Microsimulation Models: A Methodological Survey"; Journal of Artificial Societies and Social Simulation 17 (4) 12, Oct. 31, 2014, 11 pages.
Brave, Scott A. et al.; "Nowcasting Using the Chicago Fed National Activity Index"; Federal Reserve Bank of Chicago, 2014; 107 pages.
Higgins, Patrick; "GDP Now: A Model for GDP 'Nowcasting'"; Working Paper No. 2014-7, Federal Reserve Bank of Atlanta, 2014; 87 pages.
Duffy, David et al.; "Quarterly Economic Commentary"; The Economic and Social Research Institute, Oct. 8, 2014; 100 pages.
Kourentzes, Nikolaos et al.; "Increasing Knowledge Base for Nowcasting GDP by Quantifying the Sentiment About the State of Economy"; Workshop on Using Big Data for Forecasting and Statistics, Feb. 15, 2014; 16 pages.
Kunovac, Davor et al.; "Nowcasting GDP Using Available Monthly Indicators"; Croatian National Bank, Working Papers W-39, Oct. 2014; 28 pages.
Massachusetts Institute of Technology; "The Emerging Pitfalls of Nowcasting with Big Data"; Aug. 18, 2014; 6 pages.
United Nations; "Handbook on Economic Tendency Surveys"; Statistical Papers, Series M, No. 96; 2015; 253 pages.
Caruso, Alberto; "Nowcasting Mexican GDP"; Ecares Working Paper 2015-40; Oct. 2015; 30 pages.
Henzel, Steffen et al.; "Nowcasting Regional GDP: The Case of the Free State of Saxony"; CESifo Working Paper, No. 5336; Apr. 2015; 29 pages.
Galbraith, John W. et al.; "Nowcasting GDP with Electronic Payments Data"; European Central Bank (ECB); ECB Statistics Paper No. 10; Aug. 2015; 21 pages.

Kovacs, Kevin et al.; "Nowcasting German Turning Points Using CUSUM Analysis"; The George Washington University Center of Economic Research, Research Program on Forecasting (RPF); RPF Working Paper No. 2016-014; Dec. 20, 2016; 18 pages.
Modugno, Michele et al.; "Nowcasting Turkish GDP and News Decomposition"; Finance and Economics Discussion Series 2016-044; May 2016; 40 pages.
Abdalla, Ahmed; "The Power of Aggregate Book-to-Market Innovations: Forecasting, Nowcasting, and Dating the Real Economy"; London School of Economics; Jul. 2016; 52 pages.
Kim, Hyan Hak et al.; "Methods for Pastcasting, Nowcasting and Forecasting Using Factor-MIDAS"; Aug. 2016; 50 pages.
Diebold, Francis X.; "Forecasting in Economics, Business, Finance and Beyond"; University of Pennsylvania, Edition 2017, Aug. 1, 2017; 619 pages.
Chernis, Tony et al.; "A Dynamic Factor Model for Nowcasting Canadian GDP Growth"; Bank of Canada Working Paper No. 2017-2, Feb. 2017; 30 pages.
Marsilli, Clement; "Nowcasting US Inflation Using a Midas Augmented Phillips Curve"; Int. J. Computational Economics and Econometrics, vol. 7, Nos. 1/2, 2017; 14 pages.
Dahlhaus, Tatjana et al.; "Nowcasting BRIC+M in Real Time"; Bank of Canada Working Paper No. 2015-38, Oct. 2015; 45 pages.
Antolin-Diaz, Juan et al.; "Advances in Nowcasting Economic Activity"; XIII Annual Conference on Real-Time Data Analysis, Bank of Spain, Oct. 19, 2017; 50 pages.
Glaeser, Edward L. et al.; "Nowcasting the Local Economy: Using Yelp Data to Measure Economic Activity"; Harvard Business School, Working Paper 18-022, Oct. 2017; 56 pages.
Dartmouth College, Tuck School of Business, Elective Courses, 2020; 54 pages.
"King's College London PhD Studentships in Economic Measurement: Economic Statistics, Centre of Excellence 2017, UK"; 2017; 6 pages.
University of Kansas Economics; Student Conference Presentations 2007-2015; 7 pages.
Federal Reserve Bank of New York, Research and Statistic Group, Research Analyst Program; 2018; 12 pages.
"Advanced Workshop for Central Bankers"; Centre for International Macroeconomics, Northwestern University, Sep. 6-13, 2016; 6 pages.
MIT Center for Digital Business, 2012 Calendar of Events; 2 pages.
Columbia University, Quantitative Methods in the Social Sciences (QMSS) Courses, 2012; 7 pages.
Midwest Economics Group (MEG) Program, 26th Annual Meeting of the Midwest Economics Group, Department of Economics, University of Illinois at Urbana-Champaign, Oct. 21-22, 2016; 14 pages.
European Commission, Collaboration in Research and Methodology for Official Statistics, "Workshop on Using Big Data for Forecasting and Statistics"; Apr. 7-8, 2014; 4 pages.
Norges Bank, Central Bank of Norway, "Recent Developments in the Econometrics of Macroeconomics and Finance"; Jun. 2-4, 2010; 2 pages.
Brandeis University, Econ/Fin250a Introduction, Spring 2018; 4 pages.
Federal Reserve Bank of Atlanta; "Nowcast for Real Gross Private Domestic Investment: Fixed Investment: Business"; Mar. 1, 2018; 34 pages.
Nowcasting Scotland, "February Nowcasts!"; Feb. 6, 2018; 2 pages.
PwC Global; "Economic Integration: The Key to Unlocking ASEAN's Export Potential?"; Global Economy Watch Monthly Macroeconomic Publication, Oct. 2017; 6 pages.
Fulcrum Asset Management; "Global Surveys or Hard Data—Which are the Fake News?"; 2016; 3 pages.
American Economic Association; "JOE—Dec. 2013"; 3 pages.
American Economic Association; "JOE Listings (Job Openings for Economists)"; Feb. 1, 2017-Jul. 31, 2017; 2 pages.
M. Ege Yazgan Curriculum Vitae, 2014; 1 page.
Simon Kirby Curriculum Vitae, National Institute of Economic and Social Research, 2017; 3 pages.
Jack Fosten Introduction, Google, 2017; 1 page.

(56) References Cited

OTHER PUBLICATIONS

Carl Bonham, UHERO Executive Director and Professor of Economics, University of Hawaii, 2018; 2 pages.
Ahmed M. Abdalla Curriculum Vitae, 2017; 4 pages.
Ozertem et al., "Recursive Generalized Eigendecomposition for Independent Component Analysis", Independent Component Analysis and Blind Signal Separation, vol. 3889, (2006), pp. 198-205.
"CBOE S&P 500 Implied Correlation Index", Chicago Board Options Exchange, Incorporated, (2009), 9 pgs.
Guzman, Giselle, "Sexonomics: Gender, Wealth, and Expectations in Financial Markets", Journal of Economic and Social Measurement, 37, (2012), pp. 1-60.
Klein et al., "The University of Pennsylvania Model for High-Frequency Economic Forecasting," Economic & Financial Modeling, Autumn 1995.
Klein et al., "Combinations of High and Low Frequency Data in Macroeconomics Models," University of Pennsylvania, 2008.
Giannone, Domenico; Reichlin, Lucrezia; Small, David, (May 2008), "Nowcasting: The real-time informational content of macroeconomic data," Journal of Monetary Economics (Elsevier) 55(4): pp. 665-676.
Camacho, Maximo; Perez-Quiros, Gabriel (2010), "Introducing the euro-sting: Short-term indicator of Euro Area Growth," Journal of Applied Econometrics (John Wiley & sons) 25 (4): pp. 663-694.
Evans, Martin D.D. (Sep. 2005). "Where Are We Now? Real-Time Estimates of the Macroeconomy," International Journal of Central Banking 1(2).
Runstler et al., "Short-term forecasting of GDP using large datasets: a pseudo real-time forecast evaluation exercise," Journal of Forecasting (John Wiley & Sons) 28(7) C. (2009), pp. 595-611.
Giannone, Domenico et al. (Nov. 23, 2009), "Is the UK still in recession? We don't think so." Vox.
Banbura, Marta et al., "Nowcasting," Working Papers ECARES 2010-021, Oxford Handbook on Economic Forecasting (2010).
Andreou, Elena, et al., "Forecasting with Mixed-Frequency Data," Oxford Handbook of Economic Forecasting, (2010).
Andreou, Elena et al., "Regression models with Mixed Sampling Frequencies," Journal of Econometrics, (2010), pp. 256-261.
A. Ang et al., "Do macro variables, asset markets, or surveys forecast inflation better?" Journal of Monetary Economics, 54 (2007), pp. 1163-1212.
C. Anvik and K. Gjelstad, "Just Google It," Forecasting Norwegian unemployment: figures with web queries; Center for Research in Economics and Management CREAM Publication 11 (2010).
N. Askitas and K. Zimmerman, "Google econometrics and unemployment forecasting," Applied Economics Quarterly 65(2) (2009), pp. 107-120.
G. Calvo, "Staggered prices in a utility-maximizing framework," Journal of Monetary Economics 12 (1983), pp. 383-398.
C. Carroll, "Macroeconomic expectations of households and professional forecasters," The Quarterly Journal of Economics 118(1) (2003), pp. 269-298.
H. Choi and H. Varian, "Predicting the present with Google Trends," www.google.com/googleblogs/ . . . /googlepredictingthepresent.pdf (2009).
H. Choi and H. Varian, "Predicting initial claims for unemployment benefits," research.google.com/archive/papers/nitialclaimsUS.pdf (2009).
A. Constant and K. Zimmerman, "Face to face with the financial crisis: The U.S. Presidential election from a transnational perspective," German Institute for Economic Research Weekly Report 16/2008 (4)(2009).
F. D'Amuri, "Predicting unemployment in short samples with internet job search query data," MPRA Paper 18403 (2009).
F. D'Amuri and J. Marcucci, "Google It" Forecasting the US unemployment rate with a Google job search index, Fondazione Eni Ennco Mattei Working Papers, 421 (2010); 58 pages.
R.F. Engle and CWJ Granger, "Co-integration and error correction: Representation, estimation, and testing," Econometrica 55 (1987), pp. 251-276.

G. Eysenbach, "Infodemiology: Tracking flu-related searches on the web for syndromic suveillance," AMIA 2006, Symposium Proceedings (2006), pp. 244-248.
Pula, Gabor et al.; "Can Business Confidence Indicators Be Useful to Predict Short-Term Industrial Growth in Hungary?"; Magyar Nemzeti Bank, MNB Background Studies Mar. 2002; Sep. 2002; 38 pages.
J. Ginsberg, et al. "Detecting influenza epidemics using search engine query data," Nature 457 (19) (2009).
S. Goel et al., "Predicting consumer behavior with web search," PNAS Early Edition (2010).
E.M. Gramlich, "Models of inflation expectations formation: A comparison of household and economist forecasts," Journal of Money, Credit, and Banking, 15(2) (1983), pp. 155-173.
CWJ Granger et al., "Forecasting Economic Time Series," Academic Press, Florida, 1977, pp. vii viii, ix, 13, 14, 25.
AP Grant et al., "Inflationary expectations and rationality revisited," Economics Letters 62 (1999), pp. 331-338.
G. Guzman, "Using sentiment surveys to predict GDP growth and stock returns," in The Making of National Forecasts LR Klein, ed., Edward Elgar Publishing Ltd., London, 2009, pp. 319-351.
D. Harvey et al., "Testing the equality of prediction mean squared errors," International Journal of Forecasting, 13 (1997), pp. 281-291.
R. Kulkarni et al., "Forecasting housing prices with Google econometrics," George Mason University School of Public Policy Research Paper 10 (2009).
M. Lanne et al., "A Naive sticky information model of households' expectations," Journal of Economic Dynamics & Control, B3 (2009), pp. 1332-1344.
G. Mankiw and R. Reis, "Sticky information versus sticky prices. A proposal to replace the New Keynesian Phillips Curve," The Quarterly Journal of Economics 117(4)(2002), pp. 1295-1328.
R. Mariano and D. Preve, "Statistical Tests for Multiple Forecast Comparison," Presentation, TW Anderson Conference, Stanford University, 2008.
YP Mehra, "Survey measures of expected inflation: Revisiting the issues of predictive content and rationality." Federal Reserve Bank of Richmond Economic Quarterly 88/3 (2002), pp. 17-35.
WA Morgan, "A test for significance of the difference between the two variances in a sample from a normal to variate populations," Biometrika 31 (1939), pp. 13-19.
Elshenawy, Lamiaa M. et al., "Efficient Recursive Principal Component Analysis Algorithms for Process Monitoring", Ind. Eng. Chem. Res. 2010, 49, pp. 252-259 (Year: 2010).
Hamid Krim et al., "Two decades of Array Signal Processing Research", IEEE Signal Processing Magazine (vol. 13, Issue: 4, Jul. 1996), pp. 67-94.
Giannone, Domenico et al.; "Nowcasting GDP and Inflation: The Real-Time Informational Content of Macroeconomic Data Releases"; Finance and Economics Discussion Series, Divisions of Research & Statistics and Monetary Affairs, Federal Reserve Board, Washington D.C.; Sep. 2005, 42 pages.
Giannone, Domenico et al.; "Monetary Policy in Real Time"; NBER Macroeconomics Annual 2004, vol. 19, Apr. 2005; 65 pages.
Giannone, Domenico et al.; "Nowcasting GDP and Inflation: The Real-Time Informational Content of Macroeconomic Data Releases"; European Central Bank (ECB); ECB Working Paper No. 633, 2006; 51 pages.
Giannone, Domenico et al.; "Incorporating Conjunctural Analysis in Structural Models"; Mar. 21, 2008; 24 pages.
Angelini, Elena et al., "Short-Term Forecasts of Euro Area GDP Growth"; European Central Bank, Working Paper Series, No. 949, Oct. 2008; 31 pages.
Giannone, Domenico et al.; "Nowcasting Euro Area Economic Activity in Real-Time: The Role of Confidence Indicators"; Centre for Studies in Economics and Finance, Working Paper No. 240; Nov. 2009; 24 pages.
Banbura, Marta et al.; "Nowcasting with Daily Data"; Oct. 21, 2011; 31 pages.
Wikipedia; "Nowcasting (Economics)"; Dec. 19, 2010; 3 pages.
Wikipedia; "Nowcasting (Economics)—Old Revisions"; Dec. 19, 2010; 13 pages.

(56) References Cited

OTHER PUBLICATIONS

Schreyer, Paul et al.; "Short-Term Indicators: Using Qualitative Indicators to Update Production Indices"; OECD Science, Technology and Industry Working Papers Mar. 1996, 1996; 23 pages.
Baffigi, Alberto et al.; "Real-Time GDP Forecasting in the Euro Area"; Banca D'Italia, Temi di discussione del Servizio Studi, No. 456, Dec. 2002; 42 pages.

* cited by examiner

Fig. 3 – Correlation Risk Index Over Time
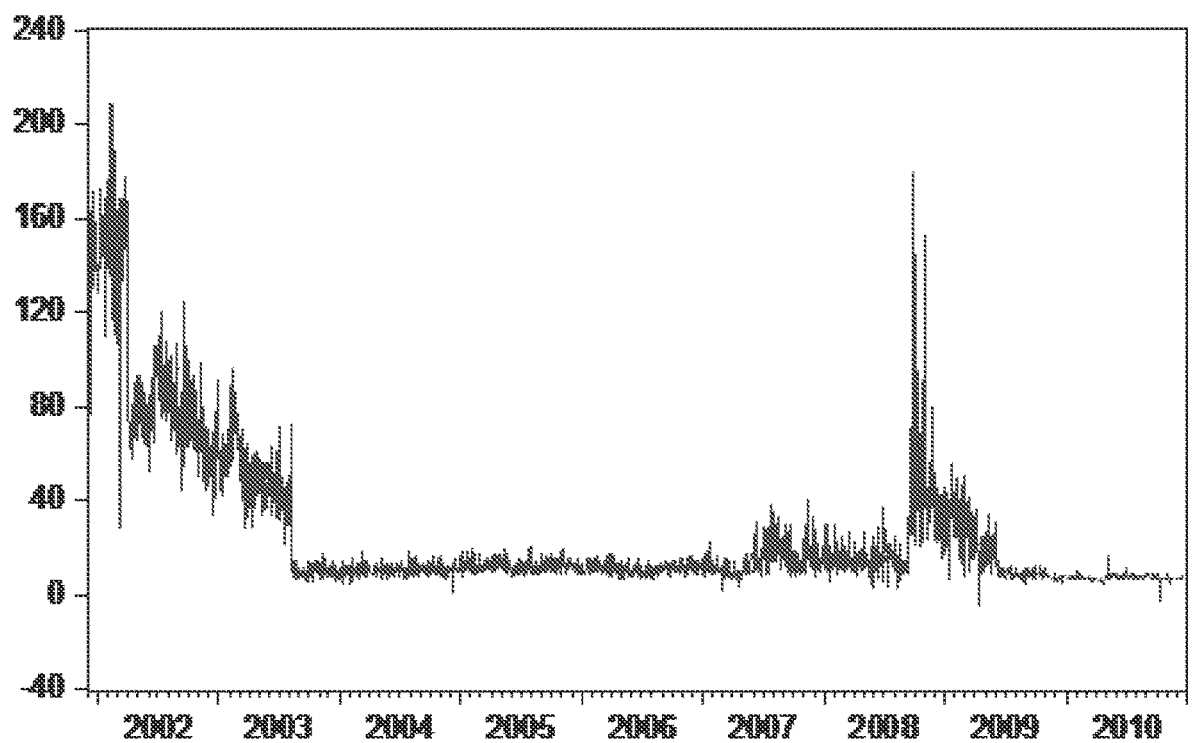

METHODS AND SYSTEMS TO QUANTIFY AND INDEX CORRELATION RISK IN FINANCIAL MARKETS AND RISK MANAGEMENT CONTRACTS THEREON

CROSS-REFERENCE TO RELATED APPLICATIONS

This application is a continuation of U.S. patent application Ser. No. 17/355,724, filed Jun. 23, 2021 which itself is a continuation of U.S. patent application Ser. No. 16/905,542, filed Jun. 18, 2020 (now U.S. Pat. No. 11,080,789), which itself is a continuation of U.S. patent application Ser. No. 13/677,278, filed Nov. 14, 2012, which claims the benefit of U.S. Provisional Patent Application No. 61/629,227, filed Nov. 14, 2011, the contents of which are incorporated by reference herein in their entireties.

This application is also related to U.S. patent application Ser. No. 13/677,273, entitled "METHODS AND SYSTEMS TO CREATE SYNTHETIC VARIABLES, INDICATORS AND INDICES FROM MULTIPLE DATA AND META-DATA SOURCES AND RISK MANAGEMENT CONTRACTS THEREON," U.S. patent application Ser. No. 13/677,276, entitled "METHODS AND SYSTEMS TO EXTRACT SIGNALS FROM LARGE AND IMPERFECT DATA SETS," U.S. patent application Ser. No. 13/677,277, entitled "METHODS AND SYSTEMS TO QUANTIFY AND INDEX LIQUIDITY RISK IN FINANCIAL MARKETS AND RISK MANAGEMENT CONTRACTS THEREON," and U.S. patent application Ser. No. 13/677,297, entitled "METHODS AND SYSTEMS TO QUANTIFY AND INDEX SENTIMENT RISK IN FINANCIAL MARKETS AND RISK MANAGEMENT CONTRACTS THEREON," all of which were filed on Nov. 14, 2012 and are incorporated by reference herein in their entireties.

TECHNICAL FIELD

The present disclosure relates to risk management in financial markets, and in particular to systems and methods for quantifying and indexing risks such that these indices can serve as underlying assets for futures and options and other financial instruments that investors would use to hedge against the risks.

BACKGROUND

Markets are incomplete, in that, it is not possible to hedge against all potential risks. Recent financial crises have highlighted the need for more effective risk management. Portfolio managers are increasingly faced with the need to better understand and efficiently manage multiple sources of risk that can affect the value of their holdings. This can be particularly challenging for holders of multiple asset classes across multiple geographies. Some customized hedging solutions are available to professional money managers, such as, for example the use of swaps. But these over-the-counter instruments are unregulated, expensive, illiquid, and carry significant counter-party risk. The over-the-counter swaps market operates in the shadows of the financial markets, with an estimated size of $650 billion. (See, e.g., http://www.huffingtonpost.com/2012/07/08/us-derivatives-reform-rules_n_1656980.html, which is hereby incorporated by reference herein in its entirety.) Indeed, the lack of transparency in the swaps market is largely blamed in the collapse of financial firms such as Lehman Brothers and insurer American International Group during the financial crisis of 2007-2009, which led to billions of dollars in government bailouts, a burden ultimately shouldered by taxpayers.

The specter of regulation looms over the derivatives market. The 2010 Dodd Frank financial reform law is meant to increase transparency in order to mitigate systemic risk, but compliance with such regulation will be expensive, and many small traders will be likely shut out of the market. Additionally, customized and complex hedging solutions through the use of swaps and other derivatives have long been out of reach for individual investors, and costly regulation will further prohibit individual investors from being able to hedge their portfolios from serious risks that can devastate the value of their portfolios. Recent decades have brought technological advances that democratized equity trading for individual investors by making online trading accessible and affordable, but effective risk management remains out of reach.

Risk management must be simplified and democratized in order to build and preserve wealth, both for institutions as well as for individuals. Risk metrics and risk management contracts must be accessible, affordable, and transparent. Improved risk management techniques will assist in mitigating the boom-bubble-bust cycles that have roiled financial markets in recent decades.

One example of improvement in risk management techniques was the introduction of the Chicago Board Options Exchange Market Volatility Index, also known by its ticker symbol, "VIX". The VIX is a popular measure of the implied volatility of S&P 500 index options. It is often referred to as the fear index or the fear gauge, because it represents one measure of the market's expectation of stock market volatility over the subsequent 30-day period. The concept of a volatility index, and financial instruments based on such an index, was first proposed by Menachem Brenner and Dan Galai in 1986, and was published in "New Financial Instruments for Hedging Changes in Volatility," appearing in the July/August 1989 issue of Financial Analysts Journal. (See, e.g., http://people.stern.nyu.edu/mbrenner/research/FAJ_articleon_Volatility_Der.pdf, which is hereby incorporated by reference herein in its entirety.)

While stock index options and futures give investors the ability to hedge against market and interest rate volatility, the VIX allows investors to hedge against the risk of changes in volatility. Changes in market volatility can be brought about by macroeconomic factors such as inflation or economic policy, or by firm-specific factors such as changes in capital structure or news about performance. The ability to hedge against changes in volatility has helped to complete the market by providing insurance against a very real and potentially devastating portfolio risk.

But markets remain significantly incomplete. Investors today are faced with a multitude of serious risks that remain uninsurable. These risks are frequently discussed by market practitioners and in the financial media, but they are discussed as broad concepts, often in nebulous terms. As of yet, there has not been a concerted effort to quantify and index many of these risks so that efficient and accessible hedging methods can be introduced.

There are three risks in particular that are of vital importance to investors participating in modern financial markets: 1) correlation risk; 2) liquidity risk; and 3) sentiment risk. We propose systems and methods to quantify and index these risks, and risk management contracts in order to insure against these risks. These indices would serve as underlying assets for futures and options and other financial instruments that investors would use to hedge against the risk of changes in correlation, liquidity, and sentiment in financial markets.

BRIEF DESCRIPTION OF THE DRAWINGS

FIG. 3 depicts an exemplary graphical display of a correlation risk index over time.

SUMMARY

Figure 1:
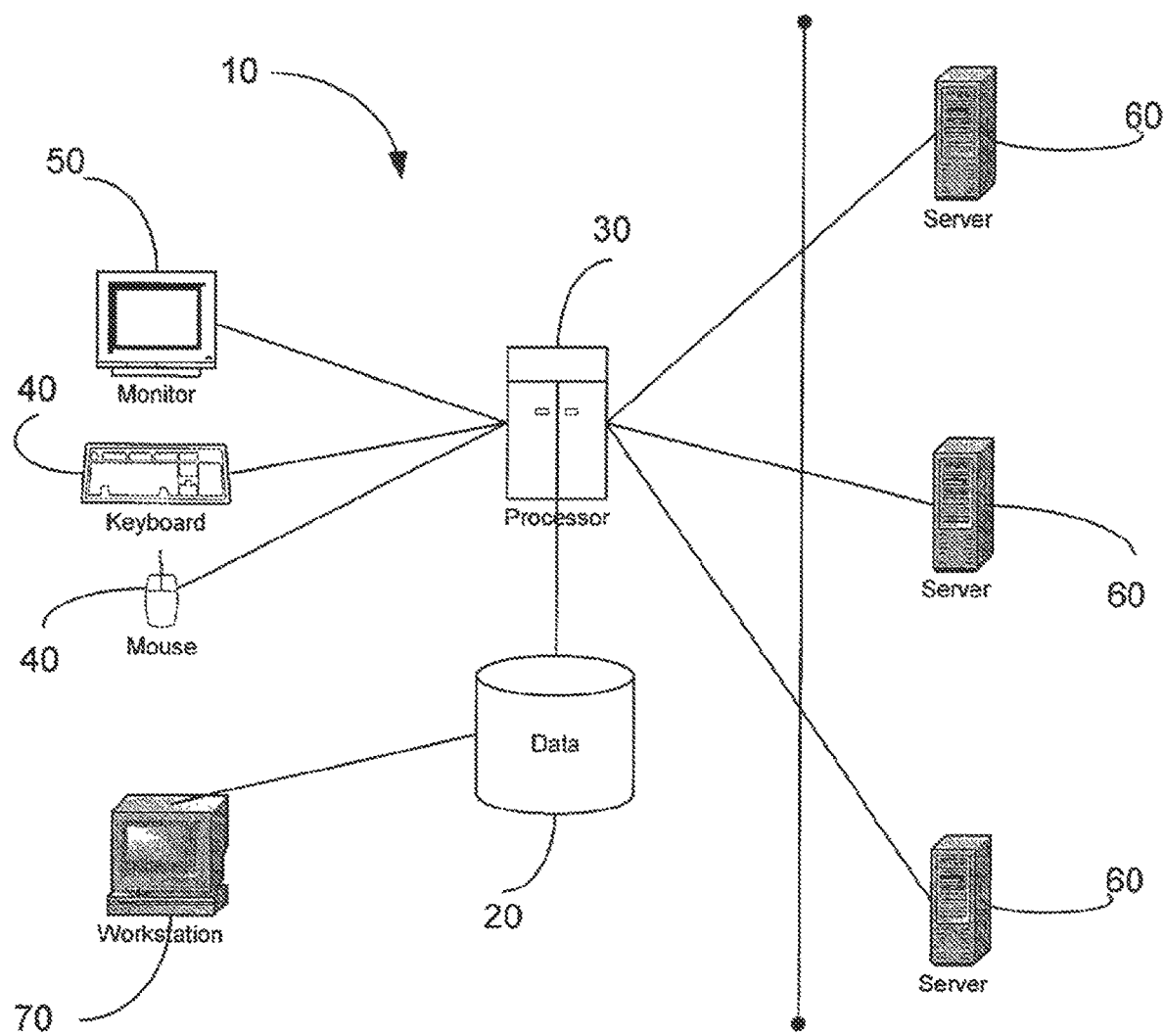
FIG. 1 illustrates an example network environment in which various exemplary embodiments of the present disclosure can operate.

Systems and methods for creating indicators to quantify and index correlation risk that is market-wide among a broad set of asset classes, a collection of assets or securities, securities in an index, or portfolio specific relative to an investor's portfolio holdings. The present disclosure relates to risk management in financial markets, and in particular to systems and methods for quantifying and indexing correlation risk such that these indices can serve as underlying assets for futures and options and other financial instruments that investors would use to hedge against the risks.

In accordance with some embodiments, a method for providing a risk index is provided, the method comprising: selecting a plurality of assets; retrieving price data associated with each of the plurality of assets over a time window; calculating returns over the time window; determining a plurality of correlation measures and correlation and risk indicators between the plurality of assets over the time window using the retrieved price and/or calculated returns data, wherein a plurality of weights are assigned to the plurality of assets; generating a correlation risk index for the plurality of assets based on the plurality of correlation measures and correlation risk indicators; and providing the correlation risk index.

In accordance with some embodiments, a system for providing a risk index is provided, the system comprising a hardware processor that is configured to: select a plurality of assets: retrieve price data associated with each of the plurality of assets over a time window; calculating returns over the time window; determine a plurality of correlation measures and correlation risk indicators between the plurality of assets over the time window using the retrieved price and/or calculated returns data, wherein a plurality of weights are assigned to the plurality of assets; generate a correlation risk index for the plurality of assets based on the plurality of correlation measures and correlation risk indicators; and provide the correlation risk index.

In accordance with some embodiments, a non-transitory computer-readable medium containing computer-executable instructions that, when executed by a processor, cause the processor to perform a method for providing a risk index, is provided. The method comprising: selecting a plurality of assets; retrieving price data associated with each of the plurality of assets over a time window; calculating returns over the time window; determining a plurality of correlation measures and correlation risk indicators between the plurality of assets over the time window using the retrieved price data and/or calculated returns data, wherein a plurality of weights are assigned to the plurality of assets; generating a correlation risk index for the plurality of assets based on the plurality of correlations measures and correlation risk indicators; and providing the correlation risk index.

In some embodiments, the method can include: alerts, displays, graphs, GUIs, comparisons, trends over time, whether the correlation risk index is increasing or decreasing, a scrolling ticker of correlation risk index levels and changes (numerical and percent change), price impact of correlation risk on securities, predictive power of correlation risk for returns, etc.

In some embodiments, the alerts can be visual (e.g., a light bulb changing colors), graphical on screen, text coming as a text message or email alert, a scrolling ticker alert, or auditory (e.g., chimes, bells).

In some embodiments, the alerts can be based on some user-configured threshold level or rate of increase or decrease, abnormally high or low levels, sudden changes, etc.

In some embodiments, the correlation of security returns can be percent change or log returns.

In some embodiments, the correlation can be Spearman, Pearson, Kendall, time-varying, dynamic, or stochastic or any other way to measure correlation or cointegration or co-movement or dependence between assets.

In some embodiments, the method can determine changes in correlation risk over time.

In some embodiments, the method can determine market-wide or portfolio specific correlation risk, correlation risk of asset classes or a collection of assets (stocks, bonds, commodities, currencies, real estate, art, wine, stamps, any asset type) or a collection of securities or assets, securities in a well known market index, securities in a portfolio, investment style metrics (size, book-to-market, momentum, etc.), or company fundamental measures like price-to-earnings ratios.

In some embodiments, the method further comprises a scenario analysis of what would happen to level of correlation risk in a portfolio if certain trades are made or assets substituted, or if holdings of certain assets increase or decrease; and in addition a securities screening and selection module to identify candidate securities to buy or sell on the basis of correlation risk.

In some embodiments, the method further comprises analyzing portfolio holdings from an online brokerage account or manually entered by a user, or uploaded via file transfer in a format such as Excel or ascii.

In some embodiments, the method further comprises displaying correlation risk index that (i) trends over time, (ii) varies by collection of securities or assets or portfolio holdings, or (iii) concurrently trends over time and varies by collection of securities or assets or portfolio holdings.

In some embodiments, weights can be determined by any signal extraction method or algorithm, such as Wiener-Kolmogorov, Kalman Filter, Modified Principal Components Analysis-Kalman Filter, Principal Components Analysis (static, rolling, or recursive). Rolling of recursive Principal Components Analysis done on a standard correlation or covariance matrix, or a matrix of pair-wise correlations or covariances, performed sequentially after an initial ramp-up window, such that a time series of eigenvector loadings is generated, of the first and/or the n-th principal component, forming a time series of weights that are then applied to the correlations of the returns or price changes between the n assets.

In some embodiments, the method further comprises:
1) retrieving price data;
2) calculating returns on n assets;
3) determining $n(n-1)/2$ unique asset pairs;
4) calculating correlation (or covariance or any other measure of dependence) of each unique asset pair over some initial time period (e.g., 6 months), specifying an initial window of k observations;

5) expanding the window by one observation each time period (k=k+1) and calculating a running measure of correlation (the window grows one observation at a time but is anchored at the first observation; alternatively could be a rolling correlation calculation, moving average, etc.) and obtain a time series of correlations;

6) determining initial ramp-up period (e.g., 20 months) and computing a standard correlation or covariance matrix, or alternatively, a matrix of pairwise correlations or covariances;

7) performing the first eigenvalue decomposition on the matrix obtained in Step 6, and begin recursive calculation;

8) at each time period, computing a new correlation matrix, over n=n+1 observations;

9) performing new eigenvalue decomposition at each time period, and collecting the factor loadings from the first or the n-th principal component at each time period 10) generating a time series of eigenvector loadings, these become the weights for the index at each point in time.

11) perform the calculation at each time period as follows:

$$\sum_{1 \le i < j \le n}^{n(n-1)/2} w_{i,j} r_{i,j} * M + S = CRI \text{(Correlation Risk Index)}$$

where n is the number of assets, n(n−1)/2 is the number of unique asset pairs from n assets where $1 \le i \le j$ n, $w_{i,j}$ is the weight corresponding to the correlation measure for the i-th and j-th assets in a unique asset pair, $r_{i,j}$ is the correlation measure between the i-th and j-th assets in a unique asset pair, M is a multiplier and S is a scalar. It is understood that the multiplier M and scalar S may take on any value, including 1 and 0, respectively.

Alternatively, the weights could be arbitrarily determined, or they could be weights such as market-capitalization weights like the S&P index weights, or portfolio weights for a portfolio-specific correlation risk index.

In some embodiments, the method determines the correlation risk index trends over time, against other financial market benchmark indexes, economic indicators, or other risk indexes.

In some embodiments, the method determines the predictive power of the CRI by doing econometric tests, such as a cross-sectional multi-factor model, or granger causality tests against returns.

In some embodiments, a method of tracking securities to track the value of the Correlation Risk Index is provided, where financial instruments, such as futures, options, and options on futures can be issued to speculate on increasing or decreasing values of the indicators. Indices can be created from the indicators to quantify certain portfolio risks or risks in the economy—for example, correlation risk—and the derivatives or other financial instruments can be used to provide a method to hedge against those risks.

In some embodiments, the method further comprises calculating the moments of data series, wherein such calculations determine the statistical properties of the data, comprising one or more of the: (i) mean, (ii) median, (iii) mode, (iv) variance, (v) standard deviation, (vi) kurtosis, or (vii) skewness, and using these as elements of the metric.

In some embodiments, the method further comprises calculating the statistical relationships between data items, comprising one or more of (i) correlation, (ii) cointegration, or (iii) covariance, and using these as elements of the metric.

In some embodiments, a method of creating an indicator of correlation risk, comprising: selecting N assets or asset classes of interest or N securities; determining a time period over which correlation is relevant; obtaining price data for the N assets or asset classes or N securities over the time period of interest; calculating returns over the time period of interest; calculating correlation measures between the N assets or asset classes or N securities over the relevant time period; calculating correlation between the returns or price changes of the assets or asset classes in real-time, at each point in time; determining weights of each of the correlations either arbitrarily or via a signal extraction algorithm such as a rolling or recursive Principal Components Analysis or the novel MPCA-KF algorithm or any other type of signal extraction algorithm; and forming a composite correlation risk index.

In some embodiments, a method of hedging correlation risk, the method comprising: issuing derivatives—options, futures, options on futures—or ETFs to track the value of the composite correlation index, and issuing derivatives—options, futures, options on futures—or ETFs to track the value of each of the underlying correlation of asset pairs among the n assets.

In some embodiments, as the price of each underlying derivative contract on correlation of asset pairs changes, the price of the composite index changes in real time as the prices of the underlying assets change.

In some embodiments, derivative instruments on style factors and other investment discipline metrics are provided, wherein said instruments include at least one of futures, options, options on futures, and ETFs.

In some embodiments, a method of creating synthetic style factor tracking indexes to mimic style portfolios is provided, comprising: selecting a style factor to be mimicked (such as momentum, size (Small capitalization minus Big capitalization), growth or value (High book-to-market value minus Low book-to-market value), mean reversion, or contrarian); creating a hypothetical portfolio according to a set of rules that conform to the investment discipline or style; conducting hypothetical trades on the portfolio according to the set of rules belonging to the style; and calculating returns on the hypothetical trades belonging to the hypothetical portfolio; creating an index to track the hypothetical returns on the hypothetical portfolio which has been hypothetically managed according to the rules belonging to the investment style.

In some embodiments, a method of hedging synthetic style factors, comprising: issuing derivatives to track the value of the style factor index, wherein said derivatives include at least one of options, futures, options on futures and ETFs.

In some embodiments, an index showing the correlation risk among style factors and risk management contracts thereon is provided.

DETAILED DESCRIPTION

A. Overview

In exemplary embodiments of the present disclosure, systems and methods for creating a correlation risk index are presented.

Returns on asset classes such as equities, commodities, and bonds tend to be correlated. This significantly impedes diversification efforts, since correlated assets move in tandem. The result is that investors have "no place to hide" when correlations are high. Exacerbating this is the fact that correlations tend to rise in failing markets, meaning that even the most highly diversified portfolios will suffer significant losses when markets face increased volatility.

One solution to this problem is to create an index that measures and tracks asset class (securities) price or return correlation. Such an index can be generalized to track the co-movement of broadly defined asset classes, such as the correlations of returns between equities, gold, oil and bonds, for example. Similarly, such an index can be highly specialized to track individual portfolio holdings, such as the co-movement of individual stocks, ETFs, particular issues of bonds, options with particular strike prices or expiration dates, and so on.

The indicators can be constructed using price data on securities, from which returns and correlations over a certain period of time are calculated. Similarly, such an index can be constructed using other data, such as volume, or company fundamental data. An index can be constructed using either (i) a simple method, such as, for example, a weighted average whereby the weights can be arbitrarily assigned, or weighted by market capitalization which mimics index weights such as the market-capitalization weights that are applied to the S&P 500, or by applying a divisor such as that used to calculate the Dow-Jones Industrial Average, or by (ii) mathematical formulae, transformations, statistical formulae, or algorithmic methods, such as optimization or signal extraction methods such as Principal Components Analysis or another signal extraction method.

The term "data" as used herein also includes (i) the moments of the statistical distribution of the data, such as, for example, the mean, standard deviation, variance, standard deviation, kurtosis, and skewness; (ii) statistical measures of the data, such as the median and mode; (iii) transformations such as, for example, arithmetic or logarithmic: or (iv) properties of the data over time, such as, for example, a moving average. It is also understood that the term "data" further includes various statistical relationships amongst the various sources of data, such as, for example, correlations and covariances. The term data as used herein also includes technical analysis data such as relative strength indicators (RSI), moneyflow, and other price and volume data.

The term "data" is also understood herein to include so-called "style factors", which can measure the return achieved from holding a portfolio of stocks that have been selected according to certain criteria, discipline or investment style. Such factors relate to a company's size (i.e., market capitalization) and book value (i.e., the net asset value of a company, calculated by total assets minus intangible assets (patents, goodwill) and liabilities). That is, such factors relate to whether a stock is a small-capitalization or large capitalization stock, and whether the stock is considered to be cheap, i.e., a value stock, or expensive, i.e., a growth stock. Other style factors include momentum, growth at a reasonable price (GARP), mean reversion, or contrarian. Style factors can include, among others, the RMRF, SMB, and HML factors popularized by Fama and French (Fama, Eugene F.; French, Kenneth R. (1993), in "Common Risk Factors in the Returns on Stocks and Bonds". *Journal of Financial Economics* 33 (1): 3-56 and Fama, Eugene F.; French, Kenneth R. (1992). "The Cross-Section of Expected Stock Returns". *Journal of Finance* 47 (2): 427-465.) and the momentum factor (MOM) popularized by Carhart (Carhart, Mark M. (1997). "On Persistence in Mutual Fund Performance", The Journal of Finance, 52 (1): 57-32.). A style factor measures or tracks the return on a portfolio where the assets have been selected according to a certain investment approach, style or theory.

In exemplary embodiments of the present disclosure, a synthetic index can be created to track the performance of a style factor, and correlations or covariances between style factors. Further, derivatives—options, futures, and options on futures—or Exchange Traded Funds, can be issued on the value of the index, giving market participants a way to hedge the risk associated with the performance of a certain investment style, including the correlation of various investment styles. Derivative instruments can be issued on style factors and other investment discipline metrics, wherein said instruments include at least one of futures, options, options on futures, and ETFs.

It is noted that financial instruments on an index which tracks a certain investing style is a more efficient and economical way to gain portfolio exposure to an investment style, rather than investing directly in a portfolio of individual assets that meet that investment style or criteria. If an individual investor were to try to manage a portfolio of a given style, it would be very expensive to replicate that style because it would require an extremely large number of stocks, which would be onerous in terms of (1) the capital required to hold multiple positions, (2) the transaction costs, (3) the time required to manage the portfolio, and (4) the knowledge required to manage the portfolio. Thus, most individual investors are not able to hold portfolios that accurately adhere to a certain investment discipline. Alternatively, an individual investor could buy shares of a mutual fund that is managed according to a certain investing style or approach, but this can also be expensive because of the fees charged by mutual funds. It is noted that mutual funds are not and will not be supportive of (i) an index that tracks a certain investing style, and (ii) risk management contracts traded on that index, because investors would have no incentive to buy shares of the mutual fund if they could just buy shares in a synthetic portfolio represented by a style index, or derivative contracts on a style index. A style index would be a much more economical way for an investor to gain exposure to a certain investment style without incurring the costs to recreate the style portfolio or pay mutual fund fees. It is noted that the technology required to calculate returns on a style factor and create a tracking index in real time has not been widely available until recently. Therefore, indices on style factors and derivative contracts on those indices have not been commercialized due to the significant political and technological barriers.

In exemplary embodiments of the present disclosure, once generated as described herein, such indicators can be used to identify and quantify correlations that affect the economy and/or asset prices and/or securities comprising a benchmark index. In this case, the indicator becomes an index, whose value changes in real time. Thus, financial instruments—i.e., risk management contracts in the form of futures, options, and options on futures or Exchange Traded Funds (ETFs) or other financial instruments—can be introduced which track the value of such an index. This can provide financial market participants with a method of hedging certain risks that are currently neither quantified nor hedgeable.

Data, such as asset or securities prices and other data can be obtained from stock exchanges, or any number of sources including:

IHS Global Insight, Bloomberg, Reuters, Capital 10, CME Group COMEX, S&P Capital IQ, Chicago Board of Trade, Chicago Board of Options Exchange, TAQ Trade and Quote Data, NYMEX, Standard & Poors, NYSE Euronext, NASDAQ, I/B/E/S (Institutional Brokers' Estimate System), Zacks Investment Research, or similar sources.

In exemplary embodiments of the present disclosure an exemplary indicator can be tested against various types of historical data by means of (i) a simple statistical analysis, such as correlation or covariance, or by (ii) an econometric model such as Ordinary Least Squares, specified by (y=a+bx+e) whereby the indicator would obtain associated parameter estimates, such as Alpha (a, a constant), Beta (b, the covariance between x and y divided by the variance of x), the Error (e), sigma (the standard deviation of x) and sigma-squared (the variance of x). Other methods to estimate an econometric model can include, for example, General Method of Moments, Maximum Likelihood Estimate, etc. An indicator can be modeled either linearly or non-linearly. It is recognized that in several instances the data may be of different sampling frequencies, so that either the data must be converted to the same frequency, or a technique for modeling mixed frequency data must be employed such as, for example, a MIDAS (Mixed Data Sampling) regression.

In exemplary embodiments of the present disclosure indicators can be made available on a platform which allows users to (i) specify data inputs for creating custom correlation risk indicators, (ii) apply a mathematical formula, statistical method, or signal extraction algorithm to calculate the indicator, (iii) test the indicator against actual outcomes and historical data such as portfolio data, (iv) make forecasts of future values of the correlation of assets to economic data or asset prices, (v) conduct scenario analysis for how the level of correlation risk would change in a portfolio with the addition or deletion of holdings, (vi) screen and select candidate securities to buy or sell on the basis of correlation risk. The indicators can be displayed numerically, or in graphical form, and can, for example, be compared to one another, displayed in real-time or as time series historical data, and/or compared to historical outcome data to display trends and co-movements over time. In exemplary embodiments of the present disclosure such indicators can be used to forecast future outcomes and predict future values of various economic or financial conditions, quantities, or states, or asset prices.

Thus, various exemplary embodiments of the present disclosure can include one or more of the following processes, systems or methods:

1) The use of asset prices and/or returns and/or other data to make indicators regarding current and/or future correlation risks of economic or financial conditions, quantities or states, or asset prices;

2) Combining several of these data sources with (i) other asset price and/or returns data, and/or (ii) economic, financial and news data, or combining several sources of economic, financial and news data to create a composite indicator of current and/or future economic or financial conditions, quantities or states, or asset prices; in such combinations the combination weights can be determined either arbitrarily or by applying a signal extraction algorithm.

3) An analysis platform for statistical and econometric models combining correlation data with economic and financial historical and real-time data sources to generate parameter estimates and make forecasts of future values of portfolios of assets, correlations, economic or financial data or predict asset returns; and 4) Creation of an index based on the correlation risk indicators and tradable financial instruments based on the value of the index, such that if an indicator quantifies a certain risk factor, the derivative instruments (futures, options, options on futures) or Exchange Traded Fund (ETF) or other financial instruments provide a method of hedging the risk quantified by the indicator.

In exemplary embodiments of the present disclosure, where multiple data sources are chosen to construct an indicator, the data sources can be combined into a composite indicator by assigning weights to each data source after the data have been appropriately processed and transformed. It is understood that such weights range in value between −1 and 1, and collectively sum to a fixed number.

A brief review of correlation and correlation risk are presented, as well as a description of signal extraction methods, including principal components analysis.

Correlation and Correlation Risk

Correlation is a well-known concept for measuring the linear relationship between two or more variables. It plays a major role in a number of classical approaches in finance: the capital asset pricing model as well as arbitrage pricing theory (APT) rely on correlation as a measure for the dependence of financial assets. In the multivariate Black-Scholes model correlation of the log-returns is used as a measure of the dependence between assets. The main reason for the importance of correlation in these frameworks is that the considered random variables obey—under an appropriate transformation—a multivariate normal distribution. Correlation is moreover a key driver in portfolio credit models, and the term default correlation has been coined for this. Correlation as a measure of dependence fully determines the dependence structure for normal distributions and, more generally, elliptical distributions, while it fails to do so outside this class. Hence, approaches relying on multivariate Brownian motions and transformations thereof naturally determine the dependence structure via correlation. Extending this, there are a number of approaches generalizing the simple linear correlation to a time-varying (dynamic) and stochastic correlation, and related measures, such as the Pearson Product-Moment Correlation, Spearman's Rank-Order Correlation and Kendall's Tau Correlation.

Correlation risk refers to the risk of a financial loss when correlation in the market changes. It plays a central role in risk management and the pricing of financial instruments, such as basket derivatives. In risk management, correlation risk refers to the risk of a loss in a financial position occurring due to a difference between anticipated correlation and realized correlation. In particular, this occurs when the estimate of correlation was wrong or the correlation in the market changed. Asset correlation shows two typical stylized features. (See, e.g., F. Black and M. Scholes. The pricing of options and corporate liabilities. Journal of Political Economy, 81:637-654, 1973, which is hereby incorporated by reference herein in its entirety.) The first is correlation clustering, whereby periods of high (low) correlation are likely to be followed by periods of high (low) correlation. The second is asymmetry and co-movement with volatility. High volatility in falling markets goes hand in hand with a strong increase in correlation, but this is not the case for rising markets. (See, e.g., T. G. Andersen, T. Bollerslev, F. X. Diebold, and H. Ebense. The distribution of realized stock return volatility. Journal of Financial Economics, 61:43-76, 2001, which is hereby incorporated by reference herein in its entirety.) Analysis of the 1987 crash revealed that correlation risk is identified as a reason the co-movement of stock market declines and increasing volatility. (See, e.g., R. Rubinstein. Comments on the 1987 stock market crash: 11 years later. Investment Accumulation Products of Financial Institutions published by The Society of Actuaries, 2001, which is hereby incorporated by reference herein in its entirety.) Notably this reduces opportunities for diversification in stock-market declines. Correlation among assets in a portfolio is commonly referred to as the "nowhere to hide" problem, because assets that are correlated move in tandem.

Correlations play a central role in financial markets. There is considerable evidence that correlations between asset returns change over time and that stock return correlations increase when returns are low. A market-wide increase in correlations negatively affects investor welfare by lowering diversification benefits and by increasing market volatility, so that states of nature with unusually high correlations may be expensive.

For two random variables X and Y with finite and positive variances their correlation is defined as:

$$\text{Corr}(X, Y) = \frac{\text{Cov}(X, Y)}{\sqrt{\text{Var}(X) * \text{Var}(Y)}}$$

where $$\text{Cov}(X,Y) = E[(X-E(X))(Y-E(Y))]$$

is the covariance of X and Y, and E is the expectations operator.

Some properties of correlation are the following:
Corr(X,Y) is a number in [−1,1], that is, correlation is bounded by −1 and 1, and it is equal to −1 or 1 if and only if X and Y are linearly related, i.e., Y=a+bX. for constants a,b with b≠0.

Corr=−1 if $b<0$

Corr=1 if $b>0$

For constants a,b $$\text{Corr}(X+a,Y+b) = \text{Corr}(X,Y)$$

If X and Y are independent, then Corr(X,Y)=0
If Corr(X,Y)=0, then X and Y are uncorrelated.
If X is m-dimensional and Y is n-dimensional then Cov(X,Y) is given by the m×n matrix with entries Cov($X_i$,$Y_j$).
Σ=Cov(X,X) is the covariance matrix.
Σ is symmetric and positive semi-definite, i.e. $x^T \Sigma x \geq 0$ for all $x \in \mathbb{R}^m$, $$\text{Cov}(a+BX, c+DY) = B\text{Cov}(X,Y)D^T \text{ for } a \in \mathbb{R}^o, c \in \mathbb{R}^p,$$
$$B \in \mathbb{R}^{o \times m}, D \in \mathbb{R}^{p \times n}.$$

Corr(X,X) has the entries Corr($X_i$, $X_j$), 1≤i≤m, 1≤j≤n.
Correlation is invariant under linear increasing transformations such that Corr(a+bX,c±dY)=Corr(X,Y) if bc>0. If bc<0 only the sign of the correlation changes.

The correlation matrix of X is Corr(X,X). It is symmetric and positive semi-definite.

The risk management of a portfolio as well as portfolio optimization depends heavily on the correlation. For example, assume that a financial position is given by portfolio weights $w_1, \ldots, w_d$ and the distribution of the assets X is multivariate normal. Then the profit and loss (P&L) of the position is given by $$\sum_{i=1}^{d} w_i X_i,$$

normally distributed with mean $$\sum_{i=1}^{d} w_i E(X_i)$$

and variance $$\sum_{i,j=1}^{d} w_i w_j \text{Cov}(X_i, X_j)$$

which equals $$\sum_{i,j=1}^{d} w_i^2 \text{Var}(X_i)$$

if the positions are uncorrelated. Otherwise, the value-at-risk depends on the correlations of all assets and therefore a change in correlation may significantly alter the risk of the position or portfolio of assets. Hence, it is of vital importance to quantify and track the correlation risk affecting any portfolio of assets.

Principal Components Analysis and Other Signal Extraction Methods

Principal components analysis is a technique used to reduce multidimensional data sets to lower dimensions for analysis. PCA allows for a large set of correlated variables to be employed together, without the problem of multicollinearity, as the extracted factors are pairwise orthogonal. Sensitivity to units of measurement is avoided by standardizing the variables to have mean zero and unit variance, before calculating the principal components. Principal components of the indicators are formed by extracting the characteristic root of the standardized correlation or covariance matrix of the variables. That is, an eigenvalue decomposition, or an eigendecomposition, is performed. In the mathematical discipline of linear algebra, eigendecomposition, or sometimes spectral decomposition, is the factorization of a matrix into a canonical form, whereby the matrix is represented in terms of its eigenvalues and eigenvectors. Only diagonalizable matrices can be factorized in this way. The eigenvectors of a square matrix are the non-zero vectors that, after being multiplied by the matrix, either remain proportional to the original vector (i.e., change only in magnitude, not in direction) or become zero. For each eigenvector, the corresponding eigenvalue is the factor by which the eigenvector changes when multiplied by the matrix. The eigenvectors are sometimes also called characteristic vectors or latent vectors. Similarly, the eigenvalues are also known as characteristic values, characteristic roots or latent roots. The resulting eigenvector is a linear combination of the variables that allows for a common signal to be distilled from the data, thus measuring the collective impact of several indicators at once while conserving degrees of freedom. An eigenvalue tells us the proportion of total variability in a matrix associated with its corresponding eigenvector. Consequently, the eigenvector that corresponds to the highest eigenvalue tells us the dimension (axis) that generates the maximum amount of individual variability in the variables. The next eigenvector is a dimension perpendicular to the first that accounts for the second largest amount of variability, and so on. The eigenvector of the first principal component reveals the combination of variables that has the dominant impact in the overall system. The coefficient loadings of the eigenvector elements are also the correlation coefficients between the principal component and the underlying variables. It is the first principal component that will generally be taken as the synthetic data, proxy variable, latent factor or composite indicator or index. However, such synthetic data, proxy variable, latent factor or composite indicator or index is not limited to only the first principal component, as the second, third, or $n^{th}$ principal component may also be utilized.

For ease of exposition, a brief explanation of eigenvalues and eigenvectors is next presented.

An important mathematical formulation is the characteristic equation of a square matrix. If C is an n by n covariance matrix, the characteristic equation is $$|C-\lambda I|=0$$

where $\lambda$ is a scalar. Solving this equation for X reveals that the equation is an $n^{th}$ degree polynomial of $\lambda$. That is, there are as many $\lambda$s as there are variables in the covariance matrix. The n $\lambda$s that are the roots of this polynomial are known as the eigenvalues of C. Because C is symmetric, all the $\lambda$s will be real numbers (i.e., not complex or imaginary numbers), although some of the $\lambda$s may be equal to or less than 0. The $\lambda$s can be solved for in any order, but it is customary to order them from largest to smallest.

To examine what is meant here, let C denote a two by two correlation matrix that has the form:

$$\begin{pmatrix} 1 & \rho \\ \rho & 1 \end{pmatrix}$$

the quantity $C-\lambda 1$ may thus be written as:

$$C-\lambda I = \begin{pmatrix} 1 & \rho \\ \rho & 1 \end{pmatrix} - \begin{pmatrix} \lambda & 0 \\ 0 & \lambda \end{pmatrix} = \begin{pmatrix} 1-\lambda & \rho \\ \rho & 1-\lambda \end{pmatrix}$$

and the determinant is $$|C-\lambda 1|=(1-\lambda)^2-\rho^2$$

So the equation that requires solution is $$(1-\lambda)^2-\rho^2=0$$

which is a quadratic in $\lambda$ (if we had three variables it would be cubic, and if we had four variables it would be quartic, etc.). Solving the quadratic gives $$\lambda=1\pm\rho$$

The largest root depends on the sign of p.
For p>0,
Then $\lambda_1=1+p$ and $\lambda_2=1-p$.
For each $\lambda$ one can define a nonzero vector a such that $$(C-\lambda 1)a=0$$

The 0 to the right of the equals sign denotes a vector filled with 0s. Any number in a that satisfies this equation is called a latent vector or eigenvector of matrix C. Each eigenvector is associated with its own $\lambda$. It is noted that the solution to a is not unique, because if a is multiplied by any scalar, the above equation still holds. Thus, there is an infinite set of values for a, although each solution will be a scalar multiple of any other solution. It is customary to normalize the values of a by imposing the constraint that a' a=1. A latent vector subject to this constraint is called a normalized latent vector. Taking the two by two correlation matrix with p>0, then $$(C-\lambda I)a = \begin{pmatrix} 1-\lambda & \rho \\ \rho & 1-\lambda \end{pmatrix}\begin{pmatrix} a_1 \\ a_2 \end{pmatrix} = \begin{pmatrix} (1-\lambda)a_1+\rho a_2 \\ (1-\lambda)a_2+\rho a_1 \end{pmatrix} = \begin{pmatrix} 0 \\ 0 \end{pmatrix}$$

or, by carrying out the multiplication, we find $$(1-\lambda)a_1+pa_2=0$$

$$(1-\lambda)a_2+pa_1=0$$

Now taking the largest eigenvalue, $\lambda=1+p$ and substituting gives $$p(a_2-a_1)=0$$

$$p(a_1-a_2)=0$$

Thus, all we know is that $a_1=a_2$. If we let $a_1=10$, then $a_2=10$; and if we let $a_1=-0.023$, then $a_2=-0.023$. This is what was meant above when it was said that there were an infinite number of solutions where any single solution is a scalar multiple of any other solution. By requiring that a'a=1, we can settle on values of $a_1$ and $a_2$ That is, if $a_1^2+a_2^2=1$ and $a_1=a_2=a$, then $2a^2=1$ and $a=\sqrt{0.5}$.

So the first eigenvector will be a 2 by 1 column vector with both elements equaling $\sqrt{0.5}$. For the second eigenvector, we substitute 1-p for $\lambda$. This gives, $$p(a_1+a_2)=0$$

Consequently, $a_1=-a_2$. One of the a's must equal $\sqrt{0.5}$ and the other must equal $-\sqrt{0.5}$. It is immaterial which is positive and which is negative, but it is a frequent convention to make the first one ($a_1$) positive and the second one ($a_2$) negative. It is noted that the normalized eigenvectors of a two by two correlation matrix will always take on these values. The actual value of the correlation coefficient is irrelevant as long as it exceeds 0.

The Kalman (Bucy) filter is a recursive algorithm for sequentially updating the one-step ahead estimate of the state mean and variance given new information. Given initial values for the state mean and covariance, values for the system matrices $\Xi_t$, and observations on $y_t$, a Kalman filter may be used to compute one-step ahead estimates of the state and the associated mean-square error matrix, the contemporaneous or filtered state mean and variance, and the one-step ahead prediction, prediction error, and prediction error variance.

In exemplary embodiments of the present disclosure an exemplary Modified Principal Components Analysis-Kalman Filter (MPCA-KF) algorithm differs from conventional Principal Components Analysis (PCA) in several aspects. First, it is calculated recursively, thus eliminating the look-ahead bias inherent in PCA. Second, dynamic on-the-fly programming allows seamless incorporation of new, discontinued, or revised data series, thus resolving the revision issue that plagues economic and financial data. Third, it can be performed on a matrix of pairwise correlations or covariances (in addition to the standard square correlation or covariance matrix), thus allowing the calculation to be performed on imperfect data sets. Fourth, if a balanced panel is desired, missing observations can be filled in by estimating the values by ARIMA, arithmetic, or logarithmic interpolation or extrapolation, as is necessary. Fifth, tattered edges at the end of the sample caused by spontaneous arrival of new data can be smoothed by either: (i) applying a Kalman Filter or (ii) by ARIMA (Autoregressive Integrated Moving Average) or arithmetic or logarithmic extrapolation (estimating series to fill in tattered edges), thus resolving the spontaneous arrival problem associated with economic and financial data, and eliminating the need to discard valuable data observations. Alternatively, the process can include only the first step, whereby a Principal Components Analysis is performed recursively on any of a standard correlation or covariance matrix, or a matrix of pairwise correlations or covariances, in order to eliminate the look-ahead bias that is inherent in PCA. In this case, the recursion requires an initial ramp-up period of an arbitrary length of n observations to begin the process, and at each successive time period the eigenvector loadings are collected such that the end result is a time series of recursively calculated principal components, whereby the eigenvector loadings can serve as index weights. Note that such a calculation can either be calculated in a recursive or rolling fashion. It is understood that such weights range in value between −1 and 1, and collectively sum to a fixed number.

It is noted that there exists the possibility that an eigendecomposition on a matrix of pairwise correlations or covariances (as opposed to the standard PCA method which is an eigendecomposition of a standard square correlation or covariance matrix) may result in a matrix that not positive semidefinite, and the eigendecomposition cannot be performed. In this context it is recalled that a positive semidefinite matrix is a Hermitian matrix all of whose eigenvalues are nonnegative. A square matrix is called Hermitian if it is self-adjoint.

A self-adjoint matrix is a matrix A for which $A^H = \overline{A}^T = A$, where the conjugate transpose is denoted $A^H$, the transpose is $A^T$, and the complex conjugate is $\ddot{Z}$. If a matrix is self-adjoint, it is said to be Hermitian. That is, it is noted that the properties of a matrix of pairwise correlations (covariances) are not quite the same as those of a standard correlation (covariance) matrix. In the case that the matrix of pairwise correlations (covariances) is not positive semidefinite, then the data matrix is forced to become balanced or squared by either 1) filling in the missing values by estimation using ARIMA, arithmetic, or logarithmic interpolation or extrapolation; or 2) a Kalman filter is applied.

In exemplary embodiments of the present disclosure such calculation can be performed continually by automatically checking and detecting the shape of the matrix. If spontaneously arrived data have caused a tattered edge at the end of the dataset, then the data can be filled in with estimates, either by ARIMA or arithmetic or logarithmic extrapolation, or the Kalman Filter can be applied. As long as the edge remains tattered, estimates are calculated to square the tattered edge. Once estimated data have completed the tattered edge, the calculation switches back to recursive principal components analysis, and the eigendecomposition performed. Once actual data have arrived, the estimate data can be replaced by the actual values. Once new data arrives to cause a new tattered edge in the next time period, the estimation procedure is resumed until the edge becomes square; the eigendecomposition is performed; then estimates are replaced with actual data, the eigendecomposition performed again and so on, repeating as each new data point arrives. Note that if there is no missing data and all data arrive simultaneously, the calculation can be performed with a recursive or rolling Principal Components Analysis computed using a standard correlation or covariance matrix.

In exemplary embodiments of the present disclosure a calculation can be performed as follows. An initial ramp-up period can be designated, such as, for example, the first 20 observation time periods, whereby initial values are calculated using standard Principal Components Analysis (PCA). In the case that an observation is missing at any time period between time t=1 and t=20, the missing data can be estimated by ARIMA interpolation, or, for example, arithmetic or logarithmic interpolation. Then, at each successive time period after t=20, the principal components can be estimated recursively, adding a set of n observations at each successive time t. That is to say, at each point in time, an eigenvalue decomposition is performed on the standard correlation or covariance matrix, or on the matrix of pairwise correlations or covariances. Data enter the calculation dynamically via on-the-fly programming. That is, at each point in time the program automatically detects which data series are available and performs the calculation on that data set. That is, the calculation is performed at each point in time only on the data that is currently in the Information Set. If a series has been discontinued or introduced in a given time period, the Information Set reflects that change. If a data series has been revised in a given time period, then the revision enters the Information Set at that point in time, and the unrevised data also remains in the information set (or a user can instruct the program to replace the unrevised value with the revised value). In the case that a series has been revised, the newly revised value can be substituted for the previous value, or the unrevised and revised values can enter the calculation concurrently. The key is that the program can automatically detect what is in the Information Set at each point in time, so as to avoid the look-ahead bias that is inherent in standard PCA. In the case newly arrived data causes a tattered edge at time t, either (i) the data can be estimated by ARIMA or arithmetic or logarithmic extrapolation to complete the square matrix, or (ii) a Kalman Filter is applied. Instead of being performed only on a balanced data matrix and discarding newly arrived or revised data, the calculation can performed on the entire data set including the tattered edge, i.e., on an unbalanced data matrix, or data are estimated or a Kalman Filter is applied to fill the tattered edge, if necessary.

Thus, in exemplary embodiments of the present disclosure such an MPCA-KF algorithm can be applied to a standard correlation or covariance matrix, or to a matrix of pairwise correlations (covariances), generated from an unbalanced data matrix with a tattered edge. This allows signal extraction from imperfect datasets, eliminating the need to trim to a square matrix and discard valuable data. As noted herein, at the final tattered edge of newly arrived data, if the matrix of pairwise correlations (covariances) is not positive semidefinite, then either (i) the missing data are filled in by ARIMA, arithmetic, or logarithmic extrapolation; or (ii) a Kalman Filter can be applied.

Alternatively, in exemplary embodiments of the present disclosure, a two-step approach can be employed whereby first the tattered edge of newly arrived data can be truncated to form a square matrix. The modified principal components can be estimated at each point in time recursively and dynamically on either a standard correlation or covariance matrix or a matrix of pairwise correlations or covariances. Then, a Kalman Filter can be employed at the final tattered edge of newly arrived data and the estimation repeated. This two-step procedure maybe performed in a recursive fashion such that a time series of eigenvector loadings is obtained. This technique addresses the general problem of performing an analysis in real time, such as analyzing an economy, where a forecast must be conducted on the basis of data sets that, due to different arrival times, caused for example, by publication lags, result in a tattered edge, i.e., an unbalanced panel, at the end of the sample period.

Alternatively, if there is no missing data and the panel is balanced, i.e., the matrix is square, then a recursive or rolling Principal Components Analysis computed using a standard correlation or covariance matrix such that a time series of eigenvector loadings is obtained.

Thus, the method described above allows for the calculation of a signal in real-time in exemplary embodiments of the present disclosure. The method can correct the look-ahead bias that is inherent in standard PCA by performing the calculation recursively at each point in time. The method can correct the revision problem associated with official economic statistics that are subject to publication revisions because the data enter the calculation dynamically and on the fly. The method can also correct for missing data points by estimating values with ARIMA, arithmetic, or logarithmic interpolation or extrapolation. The method can correct for the spontaneous arrival problem associated with publication lags of official economic data or time zone issues in financial markets, such as the market for foreign exchange where markets close and open at different times around the world.

B. Exemplary Network Environment

FIG. 1 illustrates an example environment in which exemplary embodiments of the present disclosure can be implemented. Relevant asset/securities price data and other data can, for example, be stored on a relational database 20 (as are well known and provided by, for example, IBM, Microsoft Corporation, Oracle and the like) associated with a computer system 10 provided with and running various computational hardware and software applications necessary to generate one or more indicators. Computer system 10 can include, for example, a microprocessor 30, which is understood to include various multiple core processors, various distributed processors, etc., memory (not shown), a storage medium (not shown), input devices (e.g., keyboard, mouse, microphone, etc.) 40, and one or more monitors 50. System 10 can, for example, be operated using a conventional operating system, and can include, for example, a graphical user interface for navigating and controlling various computational aspects of the present disclosure. System 10 can, for example, also be linked to one or more external data source servers 60 that feed system 10 with some or all of the necessary external data for computing the various indicators. Alternatively, as shown in FIG. 1, a stand-alone workstation 70, including a processor, memory, input devices and storage medium may be used to access database 20, or for example, a combination of database 20 and various external data source servers (not shown) akin to external data source servers 60.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

C. Example Operation

Figure 2:
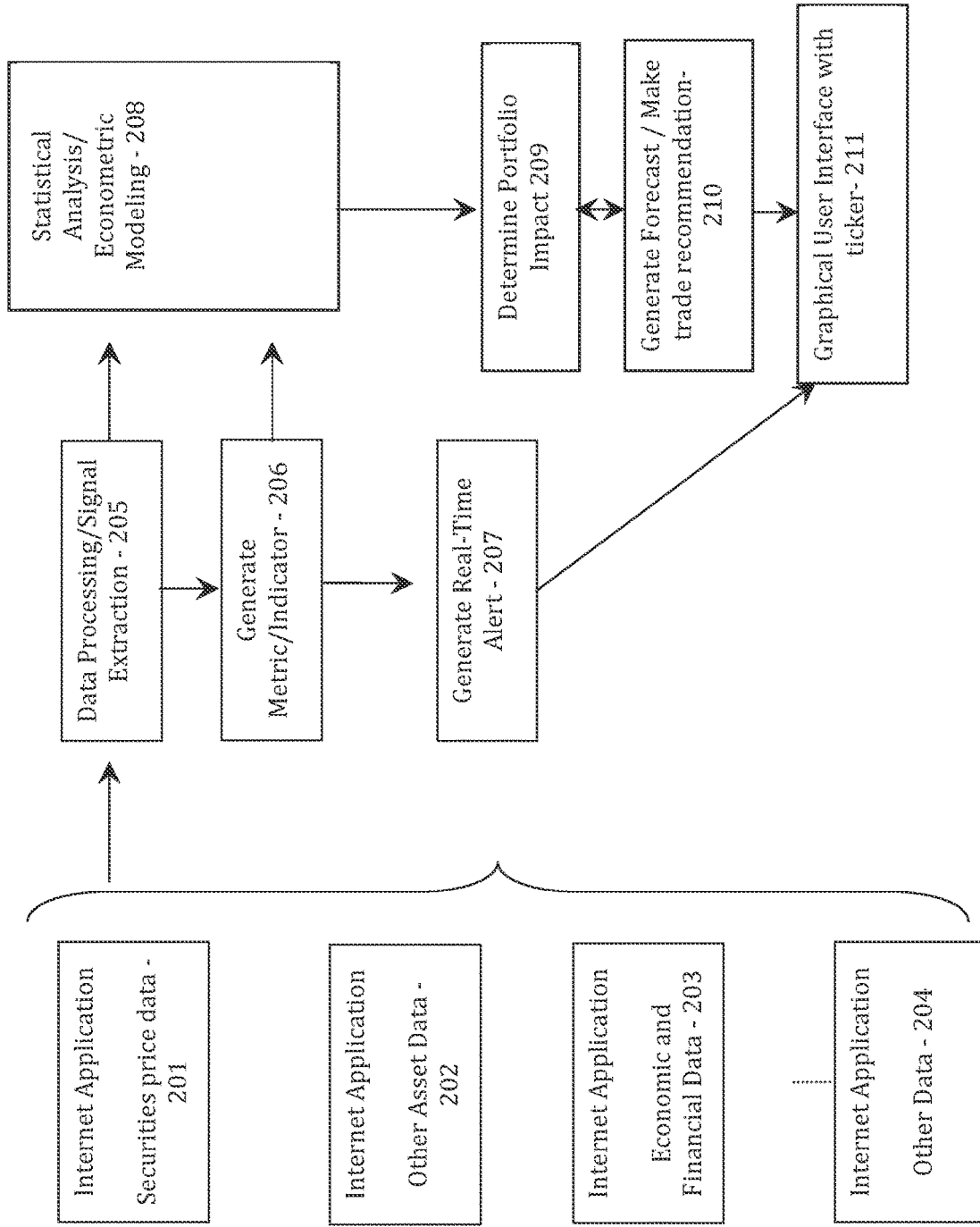
FIG. 2 is a schematic diagram illustrating the method for creating a correlation risk index.

FIG. 2 illustrates a basic process according to exemplary embodiments of the present disclosure. In operation, a forecast or trade recommendation generated at 210 can forecast financial quantities in the following general manner. Forecast 210 can generate and/or receive parameters generated by portfolio impact 209 and statistical analysis/econometric modeling 208, which receives automatically, via a network, or manually entered by a user, a set of indicators at 206 which have been processed at 205 and/or receive directly other data which has been processed solely at 206. Data received at 206 can comprise data received from various Internet applications such as, but not limited to, securities price/asset data 201, other transaction data 202, economic and financial data 203, and/or other data 204. In the processing node at 205, the data are cleaned, transformed, normalized and prepared for analysis. If an indicator is to be generated from multiple data sources, a signal is extracted at node 206. A real-time correlation risk index and alerts are generated at 207.

As noted above, where multiple data sources are chosen to construct an indicator, such data sources or keywords can be combined into one composite indicator by assigning weights to each data source after the data are processed and transformed accordingly. In exemplary embodiments of the present disclosure the weights can be assigned either arbitrarily or by some means of optimization, such as, for example, by applying a signal extraction algorithm to find the common signal among the various data. It is understood that such weights range in value between −1 and 1, and collectively sum to a fixed number. Signal extraction algorithm 206 can be, for example, a static, rolling, or recursive Principal Components Analysis which is an eigenvalue decomposition of a covariance or correlation matrix, or a matrix of pairwise correlations and covariances, or a method such as a Kalman Filter, or the Wiener-Kolmogorov (WK) signal extraction formulae, or some other method which modifies or incorporates elements of one or several well-known signal extraction techniques, such as the hybrid MPCA-KF signal extraction algorithm described herein. It is understood that such signal extraction methods may need to be modified due to the unique properties of this type of data. In exemplary embodiments of the present disclosure it is also possible to employ various signal extraction techniques in order to construct various candidate synthetic data, proxy variables or indices or composite indicators and then select the indicator which results in the lowest forecast error of estimated parameters, i.e., select the indicator which results in the best forecast.

In exemplary embodiments of the present disclosure an example system can offer as a choice several well-known signal extraction algorithms, the hybrid MPCA-KF algorithm described above, or some other hybrid or modified signal extraction method. All possible signal extraction methods can be applied concurrently in order to identify the method that results in the lowest forecast error or highest level of predictive power. An example system can run several signal extraction algorithms at once to generate candidate indices or indicators. These candidate variables can then be tested concurrently in a statistical or econometric forecasting model. The example system can then automatically identify the candidate indicator that produces the lowest forecast error or highest level of predictive power, and recommend that indicator as a suitable indicator to the user.

For example, a graph can represent data such as, the correlation risk indicator among various assets trending over time, as shown in FIG. 3. With reference thereto, FIG. 3 depicts an exemplary graphical display of a correlation risk index. It is understood that such graphical depiction may also include one or more of the following:

(i) calculating and displaying how the correlation risk trends over time;
(ii) calculating and displaying how the correlation risk varies by groups of securities or assets in a portfolio, between asset classes, or among securities comprising a benchmark financial index,
(iii) calculating and displaying how the correlation risk concurrently trends over time and varies by groups of securities or assets in a portfolio, in order to determine if trends are similar or different among different actual or hypothetical groups of securities in a portfolio;
(iv) calculating and displaying an overall volume of correlation risk in financial markets per unit of time;
(v) calculating and displaying how said correlation risk trends over time and would vary by changing the composition of a portfolio;
(vi) calculating and displaying the correlation risk of certain securities or assets, relative to other financial or economic risks;
(vii) calculating and displaying the correlation risk of certain securities or assets relative to other subject matter in the same category.

It is also understood that exemplary graphical display may be accompanied by or include the capacity to generate real-time graphical, numerical, auditory, visual or textual alerts regarding current or expected correlation risk of certain securities or assets in a portfolio, wherein said alerts can be in the form of a scrolling ticker displaying levels or changes (numerical or percent) of the correlation risk index, or generating an alert when the correlation risk index surpasses some threshold, wherein said defined threshold level is 5% greater than the average daily level of correlation risk over some time period, or some other quantity, and, wherein the real-time alerts are based on user-configurable conditions or parameters including one or more of:

(i) abnormally positive correlation risk levels;
(ii) abnormally negative correlation risk levels;
(iii) changes in correlation risk levels above or below a pre-selected threshold.

It is also understood that such a system utilizes a graphical user interface comprising a unique combination of (i) data calculation capabilities, (ii) statistical and econometric analysis and (iii) graphical reporting tools to measure and index correlation risk in a portfolio, or financial markets generally, and recommending trades or asset substitutions in a portfolio to change the correlation risk profile of the portfolio, (iv) a scenario analysis module to determine portfolio impact of changes in correlation risk, (v) a securities screening and selection module to identify candidate securities to buy or sell on the basis of correlation risk.

It is also understood that such a system may display in a graphical user interface one or more visualizations of analytic measurements of correlation risk.

Such a system may further comprise displaying one or more of: How correlation risk: (i) trends over time, (ii) varies by groups of securities or assets in a portfolio, securities in a benchmark financial index, or financial markets at large, and (iii) concurrently trends over time and varies by asset classes, groups of securities or assets in a portfolio, securities in a benchmark financial index, or financial markets at large, (iv) a scenario analysis module to determine portfolio impact of changes in correlation risk, (v) a securities screening and selection module to identify candidate securities to buy or sell on the basis of correlation risk.

It is also understood that such a system may comprise displaying correlation risk, in comparison to other benchmark indices or other risks, such as volatility, liquidity, or sentiment. Additionally, such a system may comprise correlation risk, in comparison to the consensus view of current or future economic conditions or asset prices.

Such a system may further comprise displaying how correlation risk concerning any user-configurable collection of securities or assets trends over a user-configurable time period or geographical region, economic sector, industry group, or style classification.

It is understood that such a system may further comprise a graphical user interface that allows a user to configure parameters, such as a wizard which prompts the user to set parameters by which the system calculates, delivers, and displays correlation risk metric for such a user-configurable measure. In addition, such a system may further read portfolio data such as holdings from an online source of account data, such as from an online brokerage account. Alternatively, such portfolio holdings data may be manually entered or uploaded via a file in a format such as Excel or ascii.

To further concretize the above discussion, a an example calculation of a correlation risk index is next described.

Example Calculation—Correlation Risk Indicator and Method of Hedging Correlation Risk An indicator of correlation risk for a collection of certain assets can be created, as well as for securities comprising benchmark financial index, securities comprising an individual portfolio, or an overall level of correlation risk among asset classes in financial markets that can affect a portfolio.

An indicator of correlation risk among assets or asset classes can be created, where for n assets there exist a total number of unique asset pairs equaling $n(n-1)/2$. Suppose, for example, we have the following four (4) assets: Equities (measured by the closing value of the S&P 500), Gold (measured by the spot price per ounce), Oil (measured by the spot price per barrel of NYMEX Crude), and Treasury Bonds (measured by the price of a US government 10-year bond). Then, there are 6 possible asset return correlation pairs, denoted by r, as follows:

$r_{E,G}$=EG=the correlation between returns on equities and gold $r_{E,O}$=EO=the correlation between returns on equities and oil $r_{E,B}$=EB=the correlation between returns on equities and bonds $r_{G,O}$=GO=the correlation between returns on gold and oil $r_{G,B}$=GB=the correlation between returns on gold and bonds $r_{O,B}$=OB=the correlation between returns on oil and bonds It is understood that a correlation measure has a de facto time component, inasmuch as the duration of time over which the correlation is measured must be selected such that the measure is meaningful to financial market participants. A signal extraction algorithm, such as a recursive or rolling Principal Components Analysis described above, can be used to assign weights $w_{ij}$ to each of the correlation values (or, for example, weights can be assigned arbitrarily) to produce a composite indicator of the overall correlation risk in financial markets as follows:

$CRI$(Correlation Risk Index)$=w_{E,G}r_{E,G}+w_{E,O}r_{E,O}+w_{E,B}r_{E,B}+w_{G,O}r_{G,O}+w_{G,B}r_{G,B}+w_{O,B}r_{O,B}$ Alternatively, $$\sum_{1 \leq i < j \leq n}^{n(n-1)/2} w_{i,j} r_{i,j} * M + S = CRI(\text{Correlation Risk Index})$$

where n is the number of assets, n(n−1)/2 is the number of unique asset pairs from n assets where $1 \leq i \leq j \leq n$, $w_{ij}$ is the weight corresponding to the correlation measure for the i-th and j-th assets in a unique asset pair, $r_{i,j}$ is the correlation measure between the i-th and j-th assets in a unique asset pair, M is a multiplier and S is a scalar. It is understood that the multiplier M and scalar S may take on any value, including 1 and 0, respectively. It is understood that such weights range in value between −1 and 1, and collectively sum to a fixed number.

Derivative instruments—futures, options, and options on futures—or other financial instruments can be issued to track the value of each underlying correlation metric, allowing financial market participants to speculate on the value of the correlation indicator for each security. Similarly, an Exchange Traded Fund or other financial instruments can be created to track the value of the index. As the price of each derivative contract on correlation changes, the index would change value in real time as the prices of the underlying assets change. Derivative instruments—futures, options, and options on futures—or other financial instruments can be issued to track the value of the correlation risk index, providing market participants with a method to hedge the risk of correlation between assets in a portfolio and a method to hedge the overall portfolio risk of correlation between asset classes. Similarly, an Exchange Traded Fund or other financial instruments can also be created to track the value of the index.

Example Calculation

Suppose, for example, we have the following hypothetical data representing monthly percent returns on equities, gold, oil, and bonds.

|  |  | Equities | Gold | Oil | Bonds |
|---|---|---|---|---|---|
| June 2007 t = | 1 | 8.88 | 3.44 | 8.35 | −2.73 |
| July 2007 t = | 2 | 9.76 | −5.64 | −5.07 | 6.05 |
| August 2007 t = | 3 | −6.08 | −3.46 | −4.20 | −0.82 |
| September 2007 t = | 4 | −11.47 | 0.18 | 0.92 | 2.60 |
| October 2007 t = | 5 | 14.52 | −0.30 | −2.36 | −2.68 |
| November 2007 t = | 6 | −1.01 | 2.46 | 5.29 | 3.95 |
| December 2007 t = | 7 | 1.79 | 9.60 | 9.75 | −1.35 |
| January 2008 t = | 8 | −2.95 | −8.89 | −11.90 | 2.77 |
| February 2008 t = | 9 | −2.97 | −4.51 | 2.57 | 1.47 |
| March 2008 t = | 10 | 7.26 | 0.92 | −4.84 | 0.15 |
| April 2008 t = | 11 | −12.52 | 0.43 | −3.29 | −18.94 |
| May 2008 t = | 12 | −8.27 | −2.40 | 2.71 | −10.44 |
| June 2008 t = | 13 | −2.80 | −1.57 | −2.93 | 9.89 |
| July 2008 t = | 14 | 3.74 | −1.02 | 1.48 | 6.32 |
| August 2008 t = | 15 | −6.71 | 1.65 | 1.96 | −2.30 |
| September 2008 t = | 16 | 8.15 | 3.58 | 0.86 | −2.17 |
| October 2008 t = | 17 | −1.36 | −1.28 | −3.33 | 4.39 |
| November 2008 t = | 18 | 2.11 | −1.11 | 2.76 | 3.44 |
| December 2008 t = | 19 | 3.85 | 0.31 | 1.07 | −3.44 |
| January 2009 t = | 20 | 18.45 | 4.89 | 2.80 | 3.86 |
| February 2009 t = | 21 | −10.34 | −8.74 | −5.31 | −0.85 |
| March 2009 t = | 22 | 10.74 | 1.72 | −1.02 | 3.10 |
| April 2009 t = | 23 | 4.24 | −1.27 | 7.09 | 3.88 |
| May 2009 t = | 24 | 4.74 | 2.96 | 3.03 | 1.57 |
| June 2009 t = | 25 | −0.12 | −3.35 | −7.30 | −9.14 |
| July 2009 t = | 26 | −8.78 | 4.58 | 0.64 | 1.19 |
| August 2009 t = | 27 | 8.36 | 8.64 | 8.63 | 2.01 |
| September 2009 t = | 28 | −1.36 | −12.33 | −2.84 | 5.24 |
| October 2009 t = | 29 | 4.73 | 5.63 | 4.84 | −3.93 |
| November 2009 t = | 30 | −0.24 | 4.47 | 1.90 | 1.78 |

We begin by calculating the 6 asset pairs' returns correlation measures over an initial 6-month time period (m=6) (or some other arbitrary number), from June 2007-November 2007. The estimation window is expanded by one period successively, and the calculation is repeated recursively at m=7, m=8, etc., until m=30. So we now have recursively calculated the asset pairs' returns correlation measures for periods 6 to 30, where the estimation window is expanded by one observation each period, i.e., m=m+1. The following time series of recursively calculated asset pairs' returns correlation measures is obtained:

|  |  | EG | EO | EB | GO | GB | OB |
|---|---|---|---|---|---|---|---|
| June 2007 | t = 1 |  |  |  |  |  |  |
| July 2007 | t = 2 |  |  |  |  |  |  |
| August 2007 | t = 3 |  |  |  |  |  |  |
| September 2007 | t = 4 |  |  |  |  |  |  |
| October 2007 | t = 5 |  |  |  |  |  |  |
| November 2007 | t = 6 | −0.0249342 | −0.0265902 | −0.2585826 | 0.93373232 | −0.4111696 | −0.2371038 |
| December 2007 | t = 7 | −0.0360078 | −0.036793 | −0.2425717 | 0.9307845 | −0.4548567 | −0.3384986 |
| January 2008 | t = 8 | 0.09947764 | 0.11179969 | −0.2779084 | 0.95580215 | −0.4867384 | −0.3934997 |
| February 2008 | t = 9 | 0.14095282 | 0.08734425 | −0.2826544 | 0.88921399 | −0.4839709 | −0.3838573 |
| March 2008 | t = 10 | 0.1605178 | 0.02480602 | −0.295755 | 0.83311182 | −0.4889561 | −0.3477549 |
| April 2008 | t = 11 | 0.10923528 | 0.09226848 | 0.33348525 | 0.81346403 | −0.2621948 | −0.0126216 |
| May 2008 | t = 12 | 0.13619456 | 0.04592749 | 0.40778086 | 0.78351706 | −0.1934196 | −0.0696561 |
| June 2008 | t = 13 | 0.13997027 | 0.05595248 | 0.32893585 | 0.78285614 | −0.196991 | −0.1174974 |

-continued

|  |  | EG | EO | EB | GO | GB | OB |
|---|---|---|---|---|---|---|---|
| July 2008 | t = 14 | 0.13644551 | 0.06688026 | 0.35016912 | 0.77852813 | −0.1943611 | −0.0908244 |
| August 2008 | t = 15 | 0.10174229 | 0.04387599 | 0.35705066 | 0.7810199 | −0.202549 | −0.0976385 |
| September 2008 | t = 16 | 0.16062035 | 0.05409369 | 0.32566538 | 0.76752443 | −0.2118156 | −0.1001958 |
| October 2008 | t = 17 | 0.16245583 | 0.05949289 | 0.313058 | 0.76592717 | −0.2177902 | −0.1239383 |
| November 2008 | t = 18 | 0.15908981 | 0.06809349 | 0.31865694 | 0.75268847 | −0.2211531 | −0.1039426 |
| December 2008 | t = 19 | 0.1629873 | 0.07358772 | 0.29966247 | 0.75322188 | −0.2246269 | −0.1092966 |
| January 2009 | t = 20 | 0.28005536 | 0.12507861 | 0.32904441 | 0.75105288 | −0.1699447 | −0.089229 |
| February 2009 | t = 21 | 0.36854471 | 0.18572689 | 0.32316895 | 0.76025763 | −0.1401703 | −0.0795672 |
| March 2009 | t = 22 | 0.38295765 | 0.16973999 | 0.33867624 | 0.75036113 | −0.1258781 | −0.0833155 |
| April 2009 | t = 23 | 0.37812761 | 0.18525811 | 0.34512759 | 0.70229488 | −0.1301467 | −0.0389456 |
| May 2009 | t = 24 | 0.38614264 | 0.19371792 | 0.34744741 | 0.70740422 | −0.1203571 | −0.0331856 |
| June 2009 | t = 25 | 0.38694859 | 0.19543689 | 0.3408623 | 0.71177449 | −0.0667263 | 0.06365804 |
| July 2009 | t = 26 | 0.30681888 | 0.18314141 | 0.32051198 | 0.69722821 | −0.0548147 | 0.06468804 |
| August 2009 | t = 27 | 0.34702891 | 0.22770434 | 0.32657836 | 0.73353953 | −0.0243163 | 0.08267382 |
| September 2009 | t = 28 | 0.33274532 | 0.23268104 | 0.3112572 | 0.69601082 | −0.1018275 | 0.0611322 |
| October 2009 | t = 29 | 0.3424034 | 0.24308945 | 0.29557983 | 0.70654222 | −0.1288171 | 0.03668656 |
| November 2009 | t = 30 | 0.33134619 | 0.24067005 | 0.29314989 | 0.70461442 | −0.1173969 | 0.03963129 |

Next, we perform a recursive Principal Components Analysis, that is, we perform a recursive eigenvalue decomposition on the asset pairs' returns correlation measures we have just generated. We set an initial ramp-up period of 20 (or some other arbitrary number) observations to begin the calculation at June 2009, again expanding the estimation window by one observation at each time period, such that m=m+1. At each period, we perform a principal components analysis, that is, we obtain a correlation matrix, perform the eigenvalue decomposition, and obtain the eigenvector loadings, also known as the weights. We do the analysis recursively for the rest of the sample period after the ramp-up window, from June 2009 to November 2009. We obtain the following output:

Principal Components Analysis
Sample: 2007M11 2009M06
Included observations: 20
Computed using: Ordinary correlations
Extracting 6 of 6 possible components

| Eigenvalues: (Sum = 6, Average = 1) | | | | | |
|---|---|---|---|---|---|
| Number | Value | Difference | Proportion | Cumulative Value | Cumulative Proportion |
| 1 | 4.775417 | 3.825476 | 0.7959 | 4.775417 | 0.7959 |
| 2 | 0.949941 | 0.793303 | 0.1583 | 5.725358 | 0.9542 |
| 3 | 0.156638 | 0.087276 | 0.0261 | 5.881996 | 0.9803 |
| 4 | 0.069362 | 0.029596 | 0.0116 | 5.951359 | 0.9919 |
| 5 | 0.039766 | 0.030891 | 0.0066 | 5.991125 | 0.9985 |
| 6 | 0.008875 | — | 0.0015 | 6 | 1 |

| JUNE 2009 | | | | | | |
|---|---|---|---|---|---|---|
| obs | EG | EO | EB | GO | GB | OB |
| 2007M11 | −0.024934 | −0.02659 | −0.258583 | 0.933732 | −0.41117 | −0.237104 |
| 2007M12 | −0.036008 | −0.036793 | −0.242572 | 0.930785 | −0.454857 | −0.338499 |
| 2008M01 | 0.099478 | 0.1118 | −0.277908 | 0.955802 | −0.486738 | −0.3935 |
| 2008M02 | 0.140953 | 0.087344 | −0.282654 | 0.889214 | −0.483971 | −0.383857 |
| 2008M03 | 0.160518 | 0.024806 | −0.295755 | 0.833112 | −0.488956 | −0.347755 |
| 2008M04 | 0.109235 | 0.092268 | 0.333485 | 0.813464 | −0.262195 | −0.012622 |
| 2008M05 | 0.136195 | 0.045927 | 0.407781 | 0.783517 | −0.19342 | −0.069656 |
| 2008M06 | 0.13997 | 0.055952 | 0.328936 | 0.782856 | −0.196991 | −0.117497 |
| 2008M07 | 0.136446 | 0.06688 | 0.350169 | 0.778528 | −0.194361 | −0.090824 |
| 2008M08 | 0.101742 | 0.043876 | 0.357051 | 0.78102 | −0.202549 | −0.097639 |
| 2008M09 | 0.16062 | 0.054094 | 0.325665 | 0.767524 | −0.211816 | −0.100196 |
| 2008M10 | 0.162456 | 0.059493 | 0.313058 | 0.765927 | −0.21779 | −0.123938 |
| 2008M11 | 0.15909 | 0.068093 | 0.318657 | 0.752688 | −0.221153 | −0.103943 |
| 2008M12 | 0.162987 | 0.073588 | 0.299662 | 0.753222 | −0.224627 | −0.109297 |
| 2009M01 | 0.280055 | 0.125079 | 0.329044 | 0.751053 | −0.169945 | −0.089229 |
| 2009M02 | 0.368545 | 0.185727 | 0.323169 | 0.760258 | −0.14017 | −0.079567 |
| 2009M03 | 0.382958 | 0.16974 | 0.338676 | 0.750361 | −0.125878 | −0.083316 |
| 2009M04 | 0.378128 | 0.185258 | 0.345128 | 0.702295 | −0.130147 | −0.038946 |
| 2009M05 | 0.386143 | 0.193718 | 0.347447 | 0.707404 | −0.120357 | −0.033186 |
| 2009M06 | 0.386949 | 0.195437 | 0.340862 | 0.711774 | −0.066726 | 0.063658 |

| Eigenvectors (loadings): | | | | | | |
|---|---|---|---|---|---|---|
| Variable | PC 1 | PC 2 | PC 3 | PC 4 | PC 5 | PC 6 |
| EG | 0.382757 | 0.542334 | −0.26554 | −0.186681 | 0.336375 | 0.583834 |
| EC | 0.350614 | 0.626631 | 0.436045 | 0.25554 | −0.341537 | −0.335141 |
| EB | 0.41211 | −0.40025 | 0.088635 | 0.698276 | −0.078336 | 0.410345 |
| GO | −0.434112 | 0.09072 | 0.738591 | 0.056925 | 0.373373 | 0.33934 |
| GB | 0.443407 | −0.192704 | 0.139397 | −0.030324 | 0.72199 | −0.473956 |
| OB | 0.41913 | −0.328088 | 0.408104 | −0.638827 | −0.321544 | 0.196595 |

| Ordinary correlations: | | | | | | |
|---|---|---|---|---|---|---|
|  | EG | EO | EB | GO | GB | OB |
| EG | 1 | | | | | |
| EO | 0.93594 | 1 | | | | |
| EB | 0.53541 | 0.470027 | 1 | | | |
| GO | −0.771447 | −0.627468 | −0.875739 | 1 | | |
| GB | 0.712987 | 0.628286 | 0.942383 | −0.910519 | 1 | |
| OB | 0.585084 | 0.526796 | 0.926032 | −0.856649 | 0.947743 | 1 |

| JULY 2009 | | | | | | |
|---|---|---|---|---|---|---|
| obs | EG | EO | EB | GO | GB | OB |
| 2007M11 | −0.024934 | −0.02659 | −0.258583 | 0.933732 | −0.41117 | −0.237104 |
| 2007M12 | −0.036008 | −0.036793 | −0.242572 | 0.930785 | −0.454857 | −0.338499 |
| 2008M01 | 0.099478 | 0.1118 | −0.277908 | 0.955802 | −0.486738 | −0.3935 |
| 2008M02 | 0.140953 | 0.087344 | −0.282654 | 0.889214 | −0.483971 | −0.383857 |
| 2008M03 | 0.160518 | 0.024806 | −0.295755 | 0.833112 | −0.488956 | −0.347755 |
| 2008M04 | 0.109235 | 0.092268 | 0.333485 | 0.813464 | −0.262195 | −0.012622 |
| 2008M05 | 0.136195 | 0.045927 | 0.407781 | 0.783517 | −0.19342 | −0.069656 |
| 2008M06 | 0.13997 | 0.055952 | 0.328936 | 0.782856 | −0.196991 | −0.117497 |
| 2008M07 | 0.136446 | 0.06688 | 0.350169 | 0.778528 | −0.194361 | −0.090824 |
| 2008M08 | 0.101742 | 0.043876 | 0.357051 | 0.78102 | −0.202549 | −0.097639 |
| 2008M09 | 0.16062 | 0.054094 | 0.325665 | 0.767524 | −0.211816 | −0.100196 |
| 2008M10 | 0.162456 | 0.059493 | 0.313058 | 0.765927 | −0.21779 | −0.123938 |
| 2008M11 | 0.15909 | 0.068093 | 0.318657 | 0.752688 | −0.221153 | −0.103943 |
| 2008M12 | 0.162987 | 0.073588 | 0.299662 | 0.753222 | −0.224627 | −0.109297 |
| 2009M01 | 0.280055 | 0.125079 | 0.329044 | 0.751053 | −0.169945 | −0.089229 |
| 2009M02 | 0.368545 | 0.185727 | 0.323169 | 0.760258 | −0.14017 | −0.079567 |
| 2009M03 | 0.382958 | 0.16974 | 0.338676 | 0.750361 | −0.125878 | −0.083316 |
| 2009M04 | 0.378128 | 0.185258 | 0.345128 | 0.702295 | −0.130147 | −0.038946 |
| 2009M05 | 0.386143 | 0.193718 | 0.347447 | 0.707404 | −0.120357 | −0.033186 |
| 2009M06 | 0.386949 | 0.195437 | 0.340862 | 0.711774 | −0.066726 | 0.063658 |
| 2009M07 | 0.306819 | 0.183141 | 0.320512 | 0.697228 | −0.054815 | 0.064688 |

Principal Components Analysis Sample: 50
2007M11 2009M07
Included observations: 21
Computed using: Ordinary correlations
Extracting 6 of 6 possible components

| Eigenvalues: (Sum = 6, Average = 1) | | | | |
|---|---|---|---|---|
| Number | Value | Difference | Proportion | Cumulative Value | Cumulative Proportion |
| 1 | 4.8206 | 3.927779 | 0.8034 | 4.8206 | 0.8034 |
| 2 | 0.892821 | 0.744519 | 0.1488 | 5.713421 | 0.9522 |
| 3 | 0.148302 | 0.064629 | 0.0247 | 5.861724 | 0.977 |
| 4 | 0.083674 | 0.046238 | 0.0139 | 5.945397 | 0.9909 |
| 5 | 0.037436 | 0.020269 | 0.0062 | 5.982833 | 0.9971 |
| 6 | 0.017167 | — | 0.0029 | 6 | 1 |

| Eigenvectors (loadings): | | | | | | |
|---|---|---|---|---|---|---|
| Variable | PC 1 | PC 2 | PC 3 | PC 4 | PC 5 | PC 6 |
| EG | 0.384662 | 0.541.829 | −0.294595 | −0.035598 | 0.418863 | 0.5431 |
| EO | 0.358946 | 0.616657 | 0.434272 | 0.210449 | −0.402849 | −0.309393 |
| EB | 0.404565 | −0.424869 | −0.007167 | 0.759435 | −0.102049 | 0.261929 |
| GO | −0.433785 | 0.093278 | 0.697597 | 0.246333 | 0.415677 | 0.288135 |
| GB | 0.442024 | −0.191183 | 0.156405 | −0.062187 | 0.660451 | −0.550944 |
| OB | 0.419482 | −0.316845 | 0.462025 | −0.559603 | −0.207052 | 0.392622 |

| Ordinary correlations: | | | | | | |
|---|---|---|---|---|---|---|
| | EG | EO | EB | GO | GB | OB |
| EG | 1 | | | | | |
| EO | 0.935105 | 1 | | | | |
| EB | 0.543544 | 0.479175 | 1 | | | |
| GO | −0.781251 | −0.657773 | −0.866752 | 1 | | |
| GB | 0.725732 | 0.661536 | 0.925459 | −0.91779 | 1 | |
| OB | 0.606465 | 0.572341 | 0.904788 | −0.868583 | 0.95272 | 1 |

| AUGUST 2009 | | | | | | |
|---|---|---|---|---|---|---|
| obs | EG | EO | EB | GO | GB | OB |
| 2007M11 | −0.024934 | −0.02659 | −0.258583 | 0.933732 | −0.41117 | −0.237104 |
| 2007M12 | −0.036008 | −0.036793 | −0.242572 | 0.930785 | −0.454857 | −0.338499 |
| 2008M01 | 0.099478 | 0.1118 | −0.277908 | 0.955802 | −0.486738 | −0.3935 |
| 2008M02 | 0.140953 | 0.087344 | −0.282654 | 0.889214 | −0.483971 | −0.383857 |
| 2008M03 | 0.160518 | 0.024806 | −0.295755 | 0.833112 | −0.488956 | −0.347755 |
| 2008M04 | 0.109235 | 0.092268 | 0.333485 | 0.813464 | −0.262195 | −0.012622 |
| 2008M05 | 0.136195 | 0.045927 | 0.407781 | 0.783517 | −0.19342 | −0.069656 |
| 2008M06 | 0.13997 | 0.055952 | 0.328936 | 0.782856 | −0.196991 | −0.117497 |
| 2008M07 | 0.136446 | 0.06688 | 0.350169 | 0.778528 | −0.194361 | −0.090824 |
| 2008M08 | 0.101742 | 0.043876 | 0.357051 | 0.78102 | −0.202549 | −0.097639 |
| 2008M09 | 0.16062 | 0.054094 | 0.325665 | 0.767524 | −0.211816 | −0.100196 |
| 2008M10 | 0.162456 | 0.059493 | 0.313058 | 0.765927 | −0.21779 | −0.123938 |
| 2008M11 | 0.15909 | 0.068093 | 0.318657 | 0.752688 | −0.221153 | −0.103943 |
| 2008M12 | 0.162987 | 0.073588 | 0.299662 | 0.753222 | −0.224627 | −0.109297 |
| 2009M01 | 0.280055 | 0.125079 | 0.329044 | 0.751053 | −0.169945 | −0.089229 |
| 2009M02 | 0.368545 | 0.185727 | 0.323169 | 0.760258 | −0.14017 | −0.079567 |
| 2009M03 | 0.382958 | 0.16974 | 0.338676 | 0.750361 | −0.125878 | −0.083316 |
| 2009M04 | 0.378128 | 0.185258 | 0.345128 | 0.702295 | −0.130147 | −0.038946 |
| 2009M05 | 0.386143 | 0.193718 | 0.347447 | 0.707404 | −0.120357 | −0.033186 |
| 2009M06 | 0.386949 | 0.195437 | 0.340862 | 0.711774 | −0.066726 | 0.063658 |
| 2009M07 | 0.306819 | 0.183141 | 0.320512 | 0.697228 | −0.054815 | 0.064688 |
| 2009M08 | 0.347029 | 0.227704 | 0.326578 | 0.73354 | −0.024316 | 0.082674 |

Principal Components Analysis
Sample: 2007M11 2009M08
Included observations: 22
Computed using: Ordinary correlations
Extracting 6 of 6 possible components

| Eigenvalues: (Sum = 6, Average = 1) | | | | |
|---|---|---|---|---|
| Number | Value | Difference | Proportion | Cumulative Value | Cumulative Proportion |
| 1 | 4.854529 | 4.02067 | 0.8091 | 4.854529 | 0.8091 |
| 2 | 0.833859 | 0.658473 | 0.139 | 5.688388 | 0.9481 |
| 3 | 0.175386 | 0.090993 | 0.0292 | 5.863773 | 0.9773 |
| 4 | 0.084393 | 0.0503 | 0.0141 | 5.948166 | 0.9914 |
| 5 | 0.034092 | 0.016351 | 0.0057 | 5.982259 | 0.997 |
| 6 | 0.017741 | — | 0.003 | 6 | 1 |

| Eigenvectors (loadings): | | | | | | |
|---|---|---|---|---|---|---|
| Variable | PC 1 | PC 2 | PC3 | PC 4 | PC 5 | PC 6 |
| EG | 0.387955 | 0.536237 | −0.325528 | −0.03 | 0.416643 | 0.530547 |
| EO | 0.365955 | 0.61081 | 0.371369 | 0.282301 | −0.425737 | −0.306801 |
| EB | 0.398487 | −0.461489 | −0.13683 | 0.748331 | −0.089525 | 0.203716 |
| GO | −0.429973 | 0.116523 | 0.641119 | 0.381344 | 0.389259 | 0.305885 |
| GB | 0.441354 | −0.173294 | 0.226094 | −0.076895 | 0.66002 | −0.531524 |
| OB | 0.42084 | −0.287715 | 0.524635 | −0.456148 | −0.223589 | 0.454762 |

| Ordinary correlations: | | | | | | |
|---|---|---|---|---|---|---|
|  | EG | EO | EB | GO | GB | OB |
| EG | 1 | | | | | |
| EO | 0.931486 | 1 | | | | |
| EB | 0.550695 | 0.481984 | 1 | | | |
| GO | −0.786842 | −0.660987 | −0.867993 | 1 | | |
| GB | 0.74539 | 0.702026 | 0.906253 | −0.909261 | 1 | |
| OB | 0.636239 | 0.62517 | 0.885746 | −0.862569 | 0.957697 | 1 |

| SEPTEMBER 2009 | | | | | | |
|---|---|---|---|---|---|---|
| obs | EG | EO | EB | GO | GB | OB |
| 2007M11 | −0.024934 | −0.02659 | −0.258583 | 0.933732 | −0.41117 | −0.237104 |
| 2007M12 | −0.036008 | −0.036793 | −0.242572 | 0.930785 | −0.454857 | −0.338499 |
| 2008M01 | 0.099478 | 0.1118 | −0.277908 | 0.955802 | −0.486738 | −0.3935 |
| 2008M02 | 0.140953 | 0.087344 | −0.282654 | 0.889214 | −0.483971 | −0.383857 |
| 2008M03 | 0.160518 | 0.024806 | −0.295755 | 0.833112 | −0.488956 | −0.347755 |
| 2008M04 | 0.109235 | 0.092268 | 0.333485 | 0.813464 | −0.262195 | −0.012622 |
| 2008M05 | 0.136195 | 0.045927 | 0.407781 | 0.783517 | −0.19342 | −0.069656 |
| 2008M06 | 0.13997 | 0.055952 | 0.328936 | 0.782856 | −0.196991 | −0.117497 |
| 2008M07 | 0.136446 | 0.06688 | 0.350169 | 0.778528 | −0.194361 | −0.090824 |
| 2008M08 | 0.101742 | 0.043876 | 0.357051 | 0.78102 | −0.202549 | −0.097639 |
| 2008M09 | 0.16062 | 0.054094 | 0.325665 | 0.767524 | −0.211816 | −0.100196 |
| 2008M10 | 0.162456 | 0.059493 | 0.313058 | 0.765927 | −0.21779 | −0.123938 |
| 2008M11 | 0.15909 | 0.068093 | 0.318657 | 0.752688 | −0.221153 | −0.103943 |
| 2008M12 | 0.162987 | 0.073588 | 0.299662 | 0.753222 | −0.224627 | −0.109297 |
| 2009M01 | 0.280055 | 0.125079 | 0.329044 | 0.751053 | −0.169945 | −0.089229 |
| 2009M02 | 0.368545 | 0.185727 | 0.323169 | 0.760258 | −0.14017 | −0.079567 |
| 2009M03 | 0.382958 | 0.16974 | 0.338676 | 0.750361 | −0.125878 | −0.083316 |
| 2009M04 | 0.378128 | 0.185258 | 0.345128 | 0.702295 | −0.130147 | −0.038946 |
| 2009M05 | 0.386143 | 0.193718 | 0.347447 | 0.707404 | −0.120357 | −0.033186 |
| 2009M06 | 0.386949 | 0.195437 | 0.340862 | 0.711774 | −0.066726 | 0.063658 |
| 2009M07 | 0.306819 | 0.183141 | 0.320512 | 0.697228 | −0.054815 | 0.064688 |
| 2009M08 | 0.347029 | 0.227704 | 0.326578 | 0.73354 | −0.024316 | 0.082674 |
| 2009M09 | 0.332745 | 0.232681 | 0.311257 | 0.696011 | −0.101828 | 0.061132 |

Principal Components Analysis
Sample: 2007M11 2009M09
Included observations: 23
Computed using: Ordinary correlations
Extracting 6 of 6 possible components

| Eigenvalues: (Sum = 6, Average = 1) | | | | |
|---|---|---|---|---|
| Number | Value | Difference | Proportion | Cumulative Value | Cumulative Proportion |
| 1 | 4.885205 | 4.086723 | 0.8142 | 4.885205 | 0.8142 |
| 2 | 0.798482 | 0.628432 | 0.1331 | 5.683687 | 0.9473 |
| 3 | 0.17005 | 0.083986 | 0.0283 | 5.853737 | 0.9756 |
| 4 | 0.086064 | 0.043356 | 0.0143 | 5.939801 | 0.99 |
| 5 | 0.042708 | 0.025217 | 0.0071 | 5.982509 | 0.9971 |
| 6 | 0.017491 | — | 0.0029 | 6 | 1 |

| Eigenvectors (loadings): | | | | | | |
|---|---|---|---|---|---|---|
| Variable | PC 1 | PC 2 | PC 3 | PC 4 | PC 5 | PC 6 |
| EG | 0.389349 | 0.529186 | −0.365196 | 0.054464 | 0.46021 | 0.469299 |
| EO | 0.369693 | 0.605215 | 0.371935 | 0.249756 | −0.478581 | −0.259401 |
| EB | 0.393914 | −0.488903 | −0.192533 | 0.702762 | −0.19877 | 0.188022 |
| GO | −0.430319 | 0.106521 | 0.575308 | 0.5138 | 0.381657 | 0.250693 |
| GB | 0.439838 | −0.179132 | 0.204906 | 0.018028 | 0.608142 | −0.601919 |
| OB | 0.421822 | −0.266865 | 0.564146 | −0.420078 | −0.064495 | 0.50196 |

| Ordinary correlations: | | | | | | |
|---|---|---|---|---|---|---|
|  | EG | EO | EB | GO | GB | OB |
| EG | 1 | | | | | |
| EO | 0.925444 | 1 | | | | |
| EB | 0.555548 | 0.481294 | 1 | | | |
| GO | −0.79724 | −0.6872 | −0.859844 | 1 | | |
| GB | 0.755274 | 0.711442 | 0.903571 | −0.911745 | 1 | |
| OB | 0.655414 | 0.658551 | 0.874232 | −0.871686 | 0.956584 | 1 |

| OCTOBER 2009 | | | | | | |
|---|---|---|---|---|---|---|
| obs | EG | EO | EB | GO | GB | OB |
| 2007M11 | −0.024934 | −0.02659 | −0.258583 | 0.933732 | −0.41117 | −0.237104 |
| 2007M12 | −0.036008 | −0.036793 | −0.242572 | 0.930785 | −0.454857 | −0.338499 |
| 2008M01 | 0.099478 | 0.1118 | −0.277908 | 0.955802 | −0.486738 | −0.3935 |
| 2008M02 | 0.140953 | 0.087344 | −0.282654 | 0.889214 | −0.483971 | −0.383857 |
| 2008M03 | 0.160518 | 0.024806 | −0.295755 | 0.833112 | −0.488956 | −0.347755 |
| 2008M04 | 0.109235 | 0.092268 | 0.333485 | 0.813464 | −0.262195 | −0.012622 |
| 2008M05 | 0.136195 | 0.045927 | 0.407781 | 0.783517 | −0.19342 | −0.069656 |
| 2008M06 | 0.13997 | 0.055952 | 0.328936 | 0.782856 | −0.196991 | −0.117497 |
| 2008M07 | 0.136446 | 0.06688 | 0.350169 | 0.778528 | −0.194361 | −0.090824 |
| 2008M08 | 0.101742 | 0.043876 | 0.357051 | 0.78102 | −0.202549 | −0.097639 |
| 2008M09 | 0.16062 | 0.054094 | 0.325665 | 0.767524 | −0.211816 | −0.100196 |
| 2008M10 | 0.162456 | 0.059493 | 0.313058 | 0.765927 | −0.21779 | −0.123938 |
| 2008M11 | 0.15909 | 0.068093 | 0.318657 | 0.752688 | −0.221153 | −0.103943 |
| 2008M12 | 0.162987 | 0.073588 | 0.299662 | 0.753222 | −0.224627 | −0.109297 |
| 2009M01 | 0.280055 | 0.125079 | 0.329044 | 0.751053 | −0.169945 | −0.089229 |
| 2009M02 | 0.368545 | 0.185727 | 0.323169 | 0.760258 | −0.14017 | −0.079567 |
| 2009M03 | 0.382958 | 0.16974 | 0.338676 | 0.750361 | −0.125878 | −0.083316 |
| 2009M04 | 0.378128 | 0.185258 | 0.345128 | 0.702295 | −0.130147 | −0.038946 |
| 2009M05 | 0.386143 | 0.193718 | 0.347447 | 0.707404 | −0.120357 | −0.033186 |
| 2009M06 | 0.386949 | 0.195437 | 0.340862 | 0.711774 | −0.066726 | 0.063658 |
| 2009M07 | 0.306819 | 0.183141 | 0.320512 | 0.6972.28 | −0.054815 | 0.064688 |
| 2009M08 | 0.347029 | 0.227704 | 0.326578 | 0.73354 | −0.024316 | 0.082674 |
| 2009M09 | 0.332745 | 0.232681 | 0.311257 | 0.696011 | −0.101828 | 0.061132 |
| 2009M10 | 0.342403 | 0.243089 | 0.29558 | 0.706542 | −0.128817 | 0.036687 |

Principal Components Analysis
Sample: 2007M11 2009M10
Included observations: 24
Computed using: Ordinary correlations
Extracting 6 of 6 possible components

| Eigenvalues: (Sum = 6, Average = 1) | | | | |
|---|---|---|---|---|
| Number | Value | Difference | Proportion | Cumulative Value | Cumulative Proportion |
| 1 | 4.900675 | 4.118612 | 0.8168 | 4.900675 | 0.8168 |
| 2 | 0.782064 | 0.615564 | 0.1303 | 5.682739 | 0.9471 |
| 3 | 0.1665 | 0.081348 | 0.0277 | 5.849239 | 0.9749 |
| 4 | 0.085152 | 0.036373 | 0.0142 | 5.934391 | 0.9891 |
| 5 | 0.048779 | 0.031948 | 0.0081 | 5.98317 | 0.9972 |
| 6 | 0.01683 | — | 0.0028 | 6 | 1 |

| Eigenvectors (loadings): | | | | | | |
|---|---|---|---|---|---|---|
| Variable | PC 1 | PC 2 | PC 3 | PC 4 | PC 5 | PC 6 |
| EG | 0.390805 | 0.520303 | −0.393701 | 0.101498 | 0.440717 | 0.465856 |
| EO | 0.370914 | 0.604355 | 0.370442 | 0.234242 | −0.483881 | −0.266347 |
| EB | 0.39105 | −0.507936 | −0.216502 | 0.655203 | −0.28297 | 0.181232 |
| GO | −0.430873 | 0.096859 | 0.528924 | 0.588029 | 0.344984 | 0.245794 |
| GB | 0.438459 | −0.187833 | 0.181082 | 0.082187 | 0.610357 | −0.600327 |
| OB | 0.422939 | −0.247745 | 0.59021 | −0.391159 | −0.002537 | 0.508316 |

| Ordinary correlations: | | | | | | |
|---|---|---|---|---|---|---|
| | EG | EO | EB | GO | GB | OB |
| EG | 1 | | | | | |
| EO | 0.921545 | 1 | | | | |
| EB | 0.557449 | 0.47633 | 1 | | | |
| GO | −0.806043 | −0.702322 | −0.854475 | 1 | | |
| GB | 0.760562 | 0.709313 | 0.902682 | −0.912.214 | 1 | |
| OB | 0.671067 | 0.678076 | 0.867424 | −0.87738 | 0.955027 | 1 |

| NOVEMBER 2009 | | | | | | |
|---|---|---|---|---|---|---|
| obs | EG | EO | E.B | GO | GB | OB |
| 2007M11 | −0.024934 | −0.02659 | −0.258583 | 0.933732 | −0.41117 | −0.237104 |
| 2007M12 | −0.036008 | −0.036793 | −0.242572 | 0.930785 | −0.454857 | −0.338499 |
| 2008M01 | 0.099478 | 0.1118 | −0.277908 | 0.955802 | −0.486738 | −0.3935 |
| 2008M02 | 0.140953 | 0.087344 | −0.282654 | 0.889214 | −0.483971 | −0.383857 |
| 2008M03 | 0.160518 | 0.024806 | −0.295755 | 0.833112 | −0.488956 | −0.347755 |
| 2008M04 | 0.109235 | 0.092268 | 0.333485 | 0.813464 | −0.262195 | −0.012622 |
| 2008M05 | 0.136195 | 0.045927 | 0.407781 | 0.783517 | −0.19342 | −0.069656 |
| 2008M06 | 0.13997 | 0.055952 | 0.328936 | 0.782856 | −0.196991 | −0.117497 |
| 2008M07 | 0.136446 | 0.06688 | 0.350169 | 0.778528 | −0.194361 | −0.090824 |
| 2008M08 | 0.101742 | 0.043876 | 0.357051 | 0.78102 | −0.202549 | −0.097639 |
| 2008M09 | 0.16062 | 0.054094 | 0.325665 | 0.767524 | −0.211816 | −0.100196 |
| 2008M10 | 0.162456 | 0.059493 | 0.313058 | 0.765927 | −0.21779 | −0.123938 |
| 2008M11 | 0.15909 | 0.068093 | 0.318657 | 0.752688 | −0.221153 | −0.103943 |
| 2008M12 | 0.162987 | 0.073588 | 0.299662 | 0.753222 | −0.224627 | −0.109297 |
| 2009M01 | 0.280055 | 0.125079 | 0.329044 | 0.751053 | −0.169945 | −0.089229 |
| 2009M02 | 0.368545 | 0.185727 | 0.323169 | 0.760258 | −0.14017 | −0.079567 |
| 2009M03 | 0.382958 | 0.16974 | 0.338676 | 0.750361 | −0.125878 | −0.083316 |
| 2009M04 | 0.378128 | 0.185258 | 0.345128 | 0.702295 | −0.130147 | −0.038946 |
| 2009M05 | 0.386143 | 0.193718 | 0.347447 | 0.707404 | −0.120357 | −0.033186 |
| 2009M06 | 0.386949 | 0.195437 | 0.340862 | 0.711774 | −0.066726 | 0.063658 |
| 2009M07 | 0.306819 | 0.183141 | 0.320512 | 0.697228 | −0.054815 | 0.064688 |
| 2009M08 | 0.347029 | 0.227704 | 0.326578 | 0.73354 | −0.024316 | 0.082674 |
| 2009M09 | 0.332745 | 0.232681 | 0.311257 | 0.696011 | −0.101828 | 0.061132 |
| 2009M10 | 0.342403 | 0.243089 | 0.29558 | 0.706542 | −0.128817 | 0.036687 |
| 2009M11 | 0.331346 | 0.24067 | 0.29315 | 0.704614 | −0.117397 | 0.039631 |

Principal Components Analysis
Sample: 2007M11 2009M11
Included observations: 25
Computed using: Ordinary correlations
Extracting 6 of 6 possible components

| Eigenvalues: (Sum = 6, Average = 1) | | | | | |
|---|---|---|---|---|---|
| Number | Value | Difference | Proportion | Cumulative Value | Cumulative Proportion |
| 1 | 4.91657 | 4.150551 | 0.8194 | 4.91657 | 0.8194 |
| 2 | 0.766018 | 0.601334 | 0.1277 | 5.682588 | 0.9471 |
| 3 | 0.164684 | 0.07976 | 0.0274 | 5.847272 | 0.9745 |

-continued

| Eigenvalues: (Sum = 6, Average = 1) | | | | | |
|---|---|---|---|---|---|
| Number | Value | Difference | Proportion | Cumulative Value | Cumulative Proportion |
| 4 | 0.084925 | 0.033687 | 0.0142 | 5.932197 | 0.9887 |
| 5 | 0.051238 | 0.034672 | 0.0085 | 5.983435 | 0.9972 |
| 6 | 0.016565 | — | 0.0028 | 6 | 1 |

| Eigenvectors (loadings): | | | | | | |
|---|---|---|---|---|---|---|
| Variable | PC 1 | PC 2 | PC 3 | PC4 | PC 5 | PC 6 |
| EG | 0.391828 | 0.512324 | −0.425156 | 0.139569 | 0.426975 | 0.448832 |
| EO | 0.372455 | 0.602103 | 0.368137 | 0.219161 | −0.499117 | −0.257049 |
| EB | 0.388318 | −0.525441 | −0.24088 | 0.603161 | −0.347206 | 0.175335 |
| GO | −0.431179 | 0.089161 | 0.478019 | 0.655574 | 0.306985 | 0.231553 |
| GB | 0.437683 | −0.191434 | 0.162599 | 0.135369 | 0.591384 | −0.614238 |
| OB | 0.423646 | −0.233047 | 0.608896 | −0.347253 | 0.063617 | 0.520411 |

| Ordinary correlations: | | | | | | |
|---|---|---|---|---|---|---|
|  | EG | EO | EB | GO | GB | OB |
| EG | 1 | | | | | |
| EO | 0.917803 | 1 | | | | |
| EB | 0.559589 | 0.473498 | 1 | | | |
| GO | −0.812915 | −0.716106 | −0.849261 | 1 | | |
| GB | 0.766637 | 0.71306 | 0.900851 | −0.913644 | 1 | |
| OB | 0.683187 | 0.694904 | 0.86106 | −0.882415 | 0.954762 | 1 |

We see that the first principal component summarizes approximately 80% of the variation in the system. We then create a time series of the eigenvector loadings pertaining to the first principal component, over the six month time period during which the principal components were calculated.

Eigenvector Loading Summary

| Eigenvector Loadings Summary | | | | | | |
|---|---|---|---|---|---|---|
| PC 1 | W_EG | W_EO | W_EB | W_GO | W_GB | W_OB |
| 2009M06 | 0.382757 | 0.350614 | 0.41211 | −0.434112 | 0.443407 | 0.41913 |
| 2009M07 | 0.384662 | 0.358946 | 0.404565 | −0.433785 | 0.442024 | 0.419482 |
| 2009M08 | 0.387955 | 0.365955 | 0.398487 | −0.429973 | 0.441354 | 0.42084 |
| 2009M09 | 0.389349 | 0.369693 | 0.393914 | −0.430319 | 0.439838 | 0.421822 |
| 2009M10 | 0.390805 | 0.370914 | 0.39105 | −0.430873 | 0.438459 | 0.422939 |
| 2009M11 | 0.391828 | 0.372455 | 0.388318 | −0.431179 | 0.437683 | 0.423646 |

| Substitution of Values and Index Calculation |
|---|
| PC1 = (W_EG * EG) + (W_EO * EO) + (W_EB * EB) + (W_GO * GO) + (W_GB * GB) + (W_OB * OB) = Weighted Sum |
| 2009M06 = (0.38276 * 0.38694859) + (0.35061 * 0.19543689) + (0.41211 * 0.3408623) + (−0.4341 * 0.71177449) + (0.44341 * − 0.0667263) + (0.41913 * 0.06365804) = 0.045207215 |
| 2009M07 = (0.38466 * 0.30621288) + (0.35895 * 0.18314141) + (0.40457 * 0.32051198) + (−0.4338 * 0.69722821) + (0.44202 * − 0.0548147) + (0.41948 * 0.06458804) = 0.013886271 |
| 2009M08 = (0.38796* 0.34702831) + (0.36596 * 0.22770434) + (0.39849 * 0.32657836) + (−0.43 * 0.73353953) + (0.44135 * − 0.0243163) + (0.42084 * 0.08267382) = 0.056756544 |
| 2009M09 = (0.38935 * 0.33274532) + (0.36969 * 0.23268104) + (0.39391 * 0.3112572) + (−0.4303 * 0.69601082) + (0.43984 * − 0.1018275) + (0.42182 * 0.0611322) = 0.01967579 |
| 2009M10 = (0.39081 * 0.3424034) + (0.37091 * 0.24308945) + (0.39105 * 0.29557983) + (−0.4309 * 0.70654222) + (0.43846 * − 0.1288171) + (0.42294 * 0.03668656) = −0.005830063 |
| 2009M11 = (0.39183 * 0.33134619) + (0.37246 * 0.24067005) + (0.38832 * 0.29314989) + (−0.4312 * 0.70461442) + (0.43768 * − 0.1173969) + (0.42365 * 0.03963129) = −0.005103072 |

| Correlation Risk Index | | | | |
|---|---|---|---|---|
| PC 1 | Weighted Sum | *100 | +100 | Index Value |
| 2009M06 | 0.045207215 | 4.5207215 | 104.520721 | 104.520721 |
| 2009M07 | 0.013886271 | 1.38862706 | 101.388627 | 101.388627 |
| 2009M08 | 0.056756544 | 5.67565436 | 105.675654 | 105.675654 |
| 2009M09 | 0.01967579 | 1.96757903 | 101.967579 | 101.967579 |
| 2009M10 | −0.005830063 | −0.5830063 | 99.4169937 | 99.4169937 |
| 2009M11 | −0.005103072 | −0.5103072 | 99.4896928 | 99.4896928 |

Once the time series of eigenvector loadings from the first and/or n-th principal component have been obtained, and the Correlation Risk Index has been calculated, it can be analyzed on a standard analytical platform which can include graphs and summary statistics, as well as basic econometric analysis, such as OLS, MLE, GMM, etc., to determine its impact on a portfolio or predictive power for future returns. The Program allows a user to import other data to use in the analysis, for comparisons, making forecasts, etc. If the calculation utilizes real-time data via an API feed, the program can perform the calculation dynamically (in near real-time), and generate a numerical value for the index dynamically (in near real-time), as well as a graph, which updates dynamically (in near real-time), or displays the level of correlation risk in a scrolling ticker. Once the level of correlation risk affecting broad asset classes, securities comprising an index or individual portfolio or financial markets in general has been quantified and indexed, financial instruments such as options and futures can be issued to track the level of market-wide, index-specific, or portfolio-specific correlation risk such that investors can hedge against this risk.

What is claimed:

1. A computer-implemented method for determining a measure of correlation risk of respective liquidity profiles of respective assets from a plurality of assets, the method comprising:
    accessing data comprising transaction data corresponding to respective assets from the plurality of assets for a time period;
    determining respective liquidity profiles of the respective assets in the plurality of assets based on determining at least one of (i) at least one of a respective liquidity indicator, a respective liquidity measure, and a respective liquidity metric for the respective assets from the plurality of assets, or (ii) at least one of a respective liquidity risk measure and a respective liquidity risk score for the respective assets from the plurality of assets;
    performing an analysis of the respective liquidity profile of the respective assets from the plurality of assets to generate the measure of correlation risk between the respective liquidity profiles of at least two of the respective assets over a defined time window in the time period; and
    displaying, via a graphical user interface, the measure of correlation risk between the respective liquidity profiles of the at least two of the respective assets over the time window.

2. The method of claim 1, further comprising:
    creating a correlation risk index of the respective liquidity profiles of the at least two of the respective assets from the plurality of assets over a rolling time window by rolling the defined time window by a set number of time periods to identify a rolled time window;
    updating the analysis, on an on-going basis, for the rolled time window to find an updated measure of correlation risk between the respective liquidity profiles of the at least two of the respective assets from the plurality of assets over the rolled time window in the time period; and
    displaying, via a graphical user interface, the updated measure of correlation risk between the respective liquidity profiles of the at least two of the respective assets from the plurality of assets over the rolling time window.

3. The method of claim 1, further comprising:
    creating a correlation risk index of the respective liquidity profiles of the at least two of the respective assets from the plurality of assets over an expanding time window by expanding the defined time window by a set number of time periods to identify an expanded time window;
    updating the analysis, on an on-going basis, for the expanded time window to find an updated measure of correlation risk between the respective liquidity profiles of the at least two of the respective assets from the plurality of assets over the expanded time window in the time period; and
    displaying, via a graphical user interface, the updated measure of correlation risk between the respective liquidity profiles of the at least two of the respective assets from the plurality of assets over the expanded time window.

4. The method of claim 1, wherein the measure of correlation risk is a measure of a co-movement between the liquidity profiles of the at least two of the respective assets, the measure of a co-movement comprising at least one of: a correlation metric, a cointegration metric, a covariance metric, a causality metric, and a dependency metric.

5. The method of claim 4, wherein when the measure of a co-movement is a correlation metric, the correlation metric comprises at least one of: a simple correlation, a multivariate correlation, a Spearman correlation, a Pearson correlation, a Kendall correlation, a time-varying correlation, a dynamic correlation, an implied correlation, a pair-wise correlation, an historical correlation, a forecasted correlation, and a stochastic correlation.

6. The method of claim 1, wherein the analysis comprises:
    compiling a plurality of respective time series of the respective liquidity profiles of the at least two of the respective assets from the plurality of assets over the defined time window in the time period;
    generating a correlation matrix of the respective time series of the respective liquidity profiles of the at least two of the respective assets from the plurality of assets; and
    determining, based on the correlation matrix, the measure of correlation risk between respective liquidity profiles of respective pairs of the respective assets from the plurality of assets.

7. The method of claim 6, wherein the defined time window comprises one of a time interval, a data frequency, and a user-defined time period.

8. The method of claim 6, wherein the correlation matrix comprises at least one of a standard correlation matrix and a matrix of pairwise correlations.

9. The method of claim 6, wherein the respective assets comprise one or more of: any asset, an asset grouping, an equity asset, a fixed income asset, a commodity asset, a currency asset, a crypto currency asset, a non-fungible token asset, a cryptographic asset, an Exchange-Traded Fund asset, a derivative asset, a swaps instrument, an option contract, an equity option contract, a futures contract, a forward contract, an exchange traded product, an industry grouping of assets, a sector grouping of assets, a portfolio of assets, a bond, an interest-rate product, a stock, and an asset with a name.

10. The method of claim 1, wherein the analysis comprises:
    compiling respective time series of the respective liquidity profiles of the at least two of the respective assets from the plurality of assets over the defined time window in the time period;

generating a correlation matrix of the respective time series of the respective liquidity profiles for the at least two of the respective assets from the plurality of assets;

determining, based on the correlation matrix, the measure of correlation risk between respective liquidity profiles of respective pairs of the respective assets from the plurality of assets, wherein the determining further comprises determining a set of weights wherein each respective weight corresponds to a respective measure of correlation risk between respective liquidity profiles of respective pairs of respective assets;

applying a respective weight from the set of weights to a corresponding respective measure of correlation risk between respective liquidity profiles of respective pairs of respective assets;

aggregating weighted measures of correlation risk between respective liquidity profiles of respective pairs of respective assets; and generating a composite measure of correlation risk of liquidity profiles of the respective assets.

11. The method of claim 10, wherein the set of weights is determined based on at least one of: an arbitrary method; a signal extraction method, and an eigenvalue decomposition of the correlation matrix.

12. The method of claim 1, further comprising generating a trade recommendation for buying or selling assets based on at least one of: (i) the measure of correlation risk between the respective liquidity profiles of the at least two of the respective assets, and (ii) a forecasted change in the measure of correlation risk between the respective liquidity profiles of the at least two of the respective assets.

13. The method of claim 1, further comprising generating a ranking based on the measures of correlation risk of the respective liquidity profiles of the respective assets from the plurality of assets.

14. The method of claim 1, wherein performing an analysis further comprises at least one of determining how the measure of correlation risk of respective liquidity profiles of respective assets from the plurality of assets: (i) trends over time; (ii) varies by groups of assets, (iii) concurrently trends over time and varies by groups of assets; and:

displaying, via a graphical user interface, a result of performing the analysis.

15. A computer-implemented method for determining a measure of correlation between a plurality of first assets and a plurality of second assets, the method comprising:

identifying one or more of the plurality of first assets in the plurality of second assets;

quantifying the measure of correlation between the identified one or more of the plurality of first assets and the plurality of second assets; and displaying, via a graphical user interface, the measure of correlation between the identified one or more of the plurality of first assets and the plurality of second assets.

16. The method of claim 15, wherein the plurality of first assets comprises an optimized basket and the plurality of second assets comprises an exchange-traded fund composition.

17. The method of claim 15, further comprising conducting a plurality of hypothetical trades of the identified one or more of the plurality of first assets based on the measure of correlation with one or more of the plurality of second assets.

18. The method of claim 15, wherein the measure of correlation is a measure of dependency between the plurality of first assets and the plurality of second assets, the measure of dependency comprising at least one of: a simple correlation, a multivariate correlation, a Spearman correlation, a Pearson correlation, a Kendall correlation, a time-varying correlation, a dynamic correlation, an implied correlation, a pair-wise correlation, an historical correlation, a forecasted correlation, a stochastic correlation, a correlation metric, a cointegration metric, a covariance metric, a co-movement metric, a causality metric, a relatedness metric, a clustering metric, a symmetry metric, a diversification metric, a relationship metric, a similarity metric, and a dependency metric.

19. The method of claim 15, further comprising providing at least one of: (i) an identification module to identify securities, (ii) benchmarking capabilities, (iii) risk factor analytics, (iv) portfolio performance simulation using a scenario analysis module based on forecasts of at least one of interest rates, credit spreads, economic conditions, quantities, or states, financial conditions, quantities, or states, and asset prices, and (v) a screening and selection module for identifying candidate securities to buy or sell on the basis of the measure of correlation.

20. The method of claim 15, wherein the plurality of first assets and the plurality of second assets respectively comprise at least one of a currency, a swap, a commodity, a bond, an equity, a futures contract, a forward contract, an option contract, an exchange traded fund, an exchange traded note, a spread, an index, and an asset having a name.

* * * * *